(12) United States Patent
Tumblin et al.

(10) Patent No.: US 12,407,502 B2
(45) Date of Patent: Sep. 2, 2025

(54) SYSTEM AND METHOD FOR SECURE END-TO-END ELECTRONIC COMMUNICATION USING A MUTATING TABLE OF ENTROPY

(71) Applicant: Real Random IP, LLC, St. Petersburg, FL (US)

(72) Inventors: Henry R. Tumblin, Castine, ME (US); Douglass A. Hill, Marco Island, FL (US)

(73) Assignee: Real Random IP, LLC, St. Petersburg, FL (US)

( * ) Notice: Subject to any disclaimer, the term of this patent is extended or adjusted under 35 U.S.C. 154(b) by 324 days.

(21) Appl. No.: 17/988,710

(22) Filed: Nov. 16, 2022

(65) Prior Publication Data

US 2025/0106015 A1    Mar. 27, 2025

Related U.S. Application Data

(63) Continuation-in-part of application No. 17/385,817, filed on Jul. 26, 2021, now Pat. No. 11,621,841.
(Continued)

(51) Int. Cl.
*H04L 9/08* (2006.01)
*G06F 21/60* (2013.01)
(Continued)

(52) U.S. Cl.
CPC .......... *H04L 9/0869* (2013.01); *G06F 21/602* (2013.01); *G06F 21/6245* (2013.01);
(Continued)

(58) Field of Classification Search
CPC ........ G06F 21/44; G06F 9/4881; G06F 21/00; G06F 21/602; G06F 21/6245;
(Continued)

(56) References Cited

U.S. PATENT DOCUMENTS 4,227,253 A   10/1980   Ehrsam et al.
6,343,361 B1   1/2002   Nendell et al.
(Continued)

FOREIGN PATENT DOCUMENTS

EP      3701664 A1    9/2020
WO   WO 2019067002    4/2019

OTHER PUBLICATIONS

Real Random IP, LLC, International Search Report and Written Opinion, PCT/US2022/025113, Jul. 20, 2022, 11 pgs.
(Continued)

*Primary Examiner* — Catherine Thiaw
*Assistant Examiner* — Nega Woldemariam
(74) *Attorney, Agent, or Firm* — SankerIP

(57) ABSTRACT

The various implementations described herein include methods and systems for using mutatable privacy tables to secure electronic communications. A first electronic device obtains a first version of a privacy table and applies a predefined hashing algorithm to the first version of the privacy table to generate a second version of the privacy table. The first electronic device obtains a first message for transmission to a second electronic device that (i) has a copy of the first version of the privacy table and (ii) has access to the predefined hashing algorithm. The first electronic device generates a primary key based on the second version of the privacy table. The first electronic device encrypts the first message using the primary key to form an encrypted first message and transmits the encrypted first message and a version identifier for the second version of the privacy table to the second electronic device.

20 Claims, 15 Drawing Sheets

Related U.S. Application Data which is a continuation of application No. 17/382,282, filed on Jul. 21, 2021, now Pat. No. 11,924,339.

(60) Provisional application No. 63/175,548, filed on Apr. 15, 2021.

(51) Int. Cl.
    *G06F 21/62* (2013.01)
    *H04L 9/40* (2022.01)

(52) U.S. Cl.
    CPC ........ *H04L 9/0894* (2013.01); *H04L 63/0428* (2013.01); *H04L 63/0435* (2013.01)

(58) Field of Classification Search
    CPC ... G06F 21/606; H04L 9/0869; H04L 9/0894; H04L 63/0428; H04L 63/0435; H04L 9/0618; H04L 9/50; H04L 63/06; H04L 9/0662; H04L 9/3271
    See application file for complete search history.

(56) References Cited

U.S. PATENT DOCUMENTS

| | | | |
|---|---|---|---|
| 6,668,321 B2 | 12/2003 | Nendell et al. | |
| 6,904,526 B1 | 6/2005 | Hongwei | |
| 7,003,667 B1 | 2/2006 | Slick et al. | |
| 10,601,443 B1 | 3/2020 | Tourani et al. | |
| 2002/0120838 A1* | 8/2002 | Abdulkader | H04L 9/0643 713/153 |
| 2002/0186846 A1 | 12/2002 | Nyberg et al. | |
| 2004/0266449 A1 | 12/2004 | Smetters et al. | |
| 2008/0292098 A1 | 11/2008 | Akima et al. | |
| 2011/0145894 A1 | 6/2011 | Garcia Morchon et al. | |
| 2012/0063597 A1 | 3/2012 | Tropp et al. | |
| 2012/0179735 A1 | 7/2012 | Ferguson et al. | |
| 2012/0321077 A1 | 12/2012 | Shiota et al. | |
| 2013/0067016 A1* | 3/2013 | Adkins | G06F 12/1466 709/208 |
| 2013/0329886 A1 | 12/2013 | Kipnis et al. | |
| 2015/0365424 A1 | 12/2015 | Pelletier | |
| 2017/0034167 A1* | 2/2017 | Figueira | H04L 63/061 |
| 2018/0054305 A1 | 2/2018 | Djakovic et al. | |
| 2018/0181604 A1* | 6/2018 | Marohn | G06F 16/273 |
| 2018/0248691 A1 | 8/2018 | Henderson et al. | |
| 2018/0332010 A1* | 11/2018 | Graber | H04L 63/068 |
| 2019/0068558 A1* | 2/2019 | Jindal | H04L 9/0861 |
| 2019/0097789 A1 | 3/2019 | Rangayyan et al. | |
| 2019/0207758 A1* | 7/2019 | Cambou | H04L 9/0866 |
| 2020/0053061 A1* | 2/2020 | Cambou | H04L 63/0457 |
| 2020/0169541 A1* | 5/2020 | Stein | H04L 63/061 |
| 2020/0226952 A1* | 7/2020 | Lightowler | H04L 9/0637 |
| 2020/0351102 A1 | 11/2020 | Rocquelay et al. | |
| 2020/0382293 A1* | 12/2020 | Cambou | H04L 9/0866 |
| 2021/0028935 A1 | 1/2021 | Wu et al. | |
| 2021/0136044 A1* | 5/2021 | Dumitru | H04L 9/0861 |
| 2021/0173724 A1* | 6/2021 | Liu | G06F 9/546 |
| 2021/0176217 A1* | 6/2021 | Liu | H04L 12/18 |
| 2022/0337407 A1 | 10/2022 | Hill et al. | |
| 2024/0064020 A1* | 2/2024 | Kiraz | H04L 9/50 |

OTHER PUBLICATIONS

Real Random IP, LLC, International Preliminary Report on Patentability, PCT/US2022/025113, Oct. 12, 2023, 8 pgs.

Real Random IP, LLC, International Search Report and Written Opinion, PCT/US2023/079911, Mar. 21, 2024, 11 pgs.

* cited by examiner

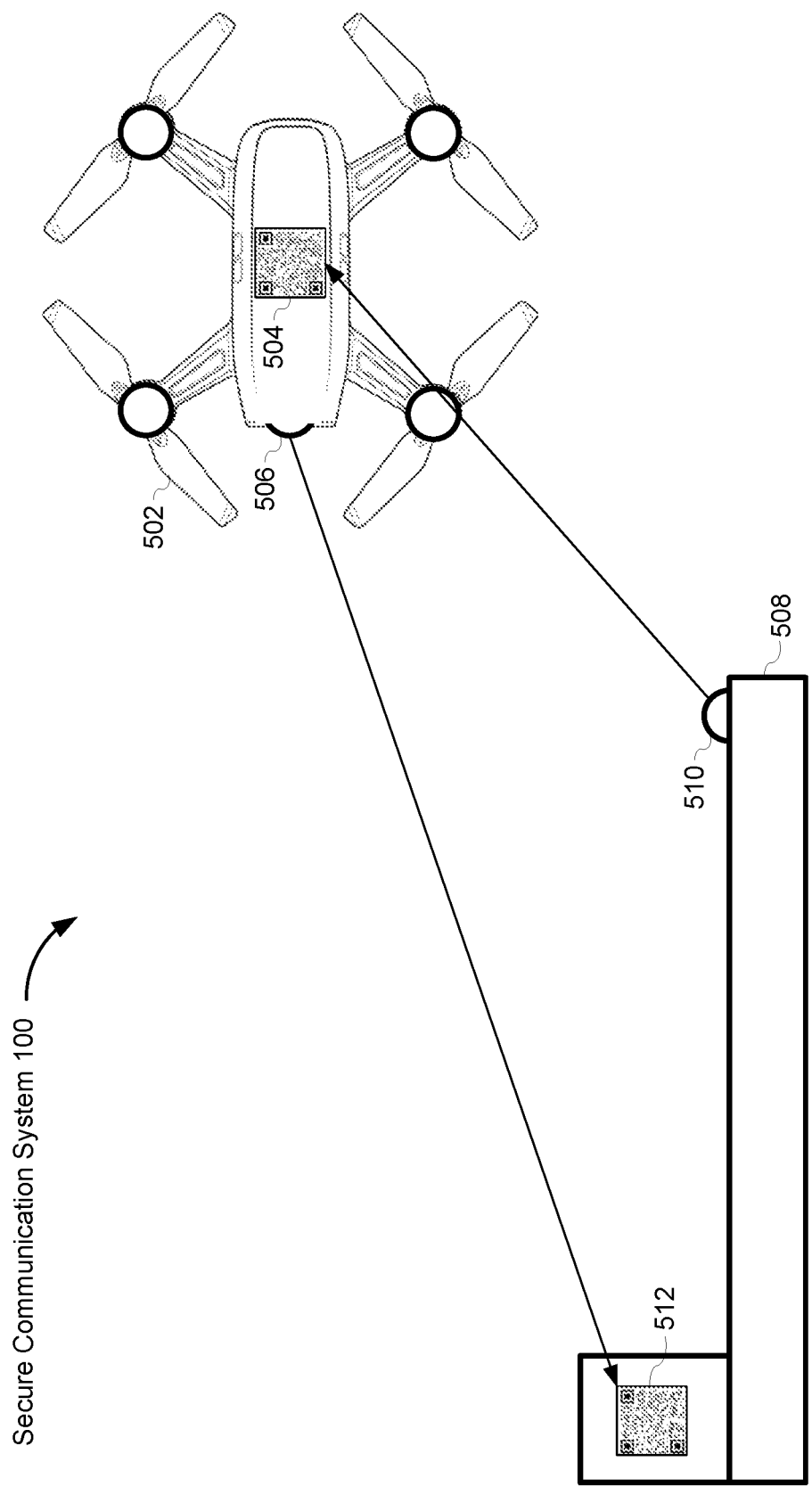

SYSTEM AND METHOD FOR SECURE END-TO-END ELECTRONIC COMMUNICATION USING A MUTATING TABLE OF ENTROPY

PRIORITY AND RELATED APPLICATIONS

This application is a continuation-in-part of U.S. patent application Ser. No. 17/385,817, filed Jul. 26, 2021, entitled "System and Method for Secure End-To-End Electronic Communication Using a Privately Shared Table of Entropy," which is a continuation of U.S. patent application Ser. No. 17/382,282, filed Jul. 21, 2021, entitled "System and Method for Secure End-To-End Electronic Communication Using a Privately Shared Table of Entropy," which claims priority to U.S. Provisional Patent Application No. 63/175,548, filed Apr. 15, 2021, entitled "System and Method for Secure End-To-End Electronic Communication Using a Privately Shared Table of Entropy," each of which is incorporated by reference herein in its entirety.

This application is related to U.S. patent application Ser. No. 16/823,286, filed Mar. 18, 2020, entitled "Electromechanical Apparatus, System, and Method for Generating True Random Numbers," which is incorporated by reference herein in its entirety.

TECHNICAL DATA FIELD

This application relates generally to secure communication, including but not limited to, secure communication using a mutating table of entropy that includes random numbers.

BACKGROUND

Random number generation is a critical component of computer and Internet security and enables encrypted end-to-end communication. Problems with security systems that utilize pseudorandom number generators (e.g., seeded computational algorithms or deterministic logic) are well known. For example, an entire random sequence generated by a pseudorandom number generator can be reproduced if the seed value is known, allowing an unauthorized party to breach the security of a system.

SUMMARY

Accordingly, there is a need for secure communication methods and systems that can efficiently and securely transmit information between devices (e.g., electronic devices) within the system.

One way to assure the integrity and security of a computerized network is to utilize keys that are created from truly randomly generated numbers (e.g., true random numbers). The embodiments herein address the problem of providing secure networks by utilizing a privately shared table of entropy (e.g., privacy table) to encrypt and decrypt data transmitted between devices of the secure communication network. The table of entropy includes real (e.g., true) random numbers. Moreover, the table of entropy can be morphed (e.g., using a current digest) to create a new value for each entry in the table (e.g., triggered based on the number of uses or a specific period of time). A morph agreement (e.g., a predefined hashing algorithm, a keyed hash, and/or other cipher) can be distributed (e.g., separately from the distribution of the table) to each user of the table of entropy so that each user device is able to morph the table in the same manner. In some embodiments, the morph agreement includes one or more ciphers (e.g., an encryption cipher that matches block sizes of elements).

In some situations, use of a morph agreement improves security and privacy by accounting for possible theft of the table of entropy or current digest of the table of entropy. For example, it allows users of the table of entropy to move forward to a new table of entropy if security concerns are raised. In some embodiments, to re-synchronize after a sender has morphed a table of entropy, the other users attempt to decrypt a message from the sender and, if decryption fails, then use the morph agreement to morph the table and attempt to decrypt again. In some embodiments, a version number is stored with each table of entropy and transmitted along with a message to improve performance of synchronizing the table of entropy.

The morphing of a privacy table also inhibits reverse-engineering of the encryption keys. For example, consider a scenario where there are several hundred drones employed in a conflict situation. During the conflict, some of the drones may be disabled and captured by an opposing force. The opposing force could potentially reverse engineer a drone and discover the privacy table. In this scenario, the opposing force could only potentially use the privacy table to decrypt/encrypt messages for the particular drone (as each drone has a distinct privacy table). Moreover, the privacy table for the particular drone would likely be insufficient as the drone owner would likely morph the privacy table before it could be used for communications by the opposing force.

In some embodiments, a respective table of entropy is stored with each application using it. In some embodiments, a container is used to store one or more tables of entropy and one or more morphings of each table (e.g., to reduce real-time processing requirements and improve decryption times). In some embodiments, the container is protected with a key such as a fingerprint, token, or a time-based one-time password (TOTP).

In some embodiments, the random numbers are generated using an electro-mechanical device that can fit in traditional data centers. In some embodiments, the generated random numbers can be used to provide Entropy-As-A-Service (EAAS). For example, EAAS can provide random numbers for generating tables of entropy that can be privately shared between devices of a secure communication network (e.g., secure communication system) for secure communication and transmission of information (e.g., data). In some embodiments, EAAS is provided from a security provider to a third party (e.g., a third-party service provider or third-party server that hosts a network or a service) to ensure secure data transmission between devices.

According to some embodiments, a method is performed at a first electronic device (e.g., sender device). The first electronic device: (i) obtains a first version of a privacy table, which comprises N first bits; (ii) applies a predefined hashing algorithm to the first version of the privacy table to generate a second version of the privacy table having N second bits; (iii) obtains a first message for transmission to a second electronic device that (a) has a copy of the first version of the privacy table and (b) has access to the predefined hashing algorithm; (iv) generates a primary key based on the second version of the privacy table; (v) encrypts the first message using the primary key to form an encrypted first message; and (vi) transmits the encrypted first message and a version identifier for the second version of the privacy table to the second electronic device.

In some embodiments, a computing device includes one or more processors, memory, and one or more programs stored in the memory. The programs are configured for execution by the one or more processors. The one or more programs include instructions for performing (or causing performance of) any of the methods described herein.

In some embodiments, a non-transitory computer-readable storage medium stores one or more programs configured for execution by a computing device having one or more processors and memory. The one or more programs include instructions for performing (or causing performance of) any of the methods described herein.

Thus, methods and systems disclosed herein provide secure communications that utilize mutating tables of entropy that include truly random numbers. Such methods and systems may complement or replace conventional methods for securing communications.

The features and advantages described in the specification are not necessarily all inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures and specification.

FIG. 5 provides an example secure communication system with a drone and a landing station in accordance with some embodiments.

DESCRIPTION OF EMBODIMENTS

Figure 1:
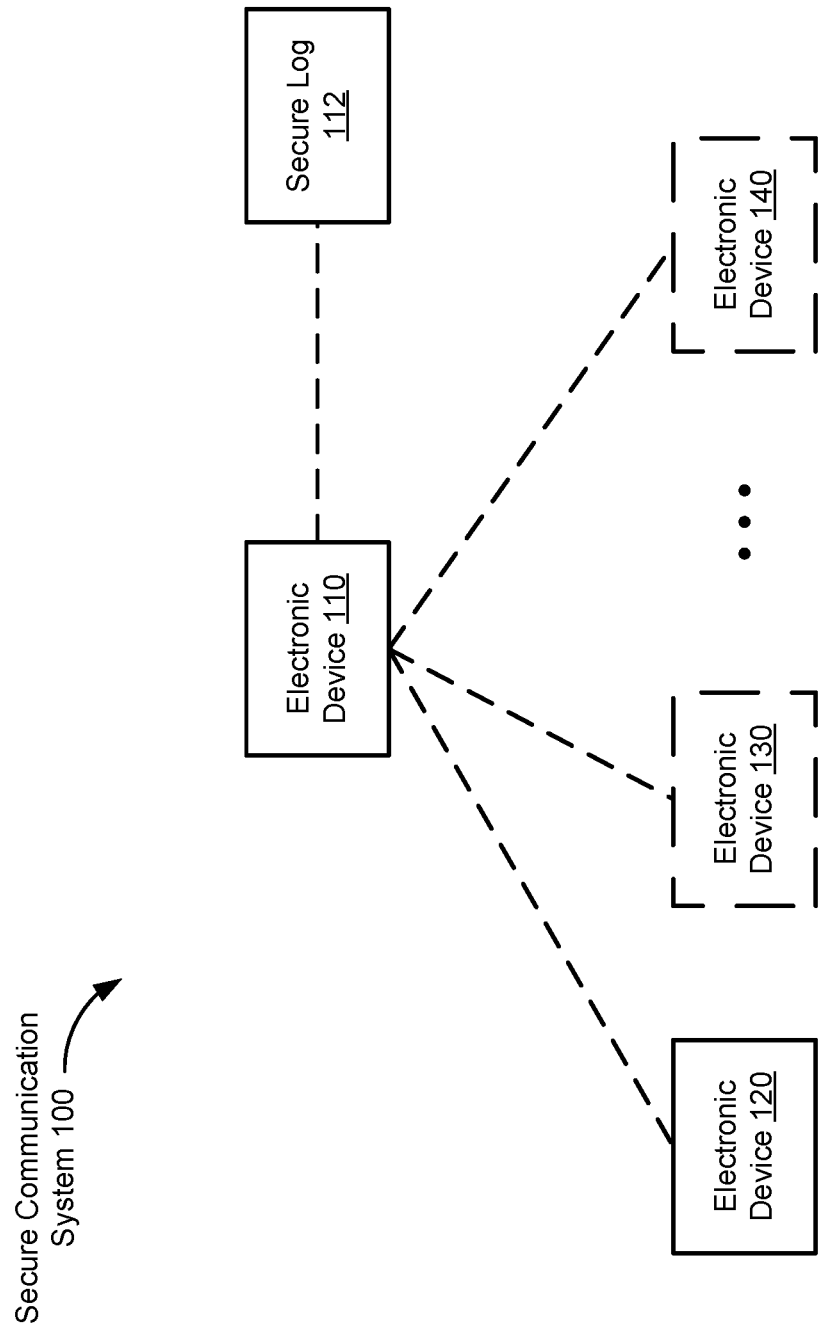
FIG. 1 illustrates an example secure communication system in accordance with some embodiments.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Entropy (randomness) is important for a strong cryptographic system. Entropy created using a true random number generator (RNG) provides stronger encryption (e.g., non-guessable keys). A One-Time Pad (OTP) is a strong encryption technique but requires a single-use pre-shared key that is not smaller than the message being sent. The resulting cyphertext is essentially impossible to decrypt as long as the following conditions are met: (i) the key must be as least as long as the plaintext; (ii) the key must be random; (iii) the key must never be reused in whole or in part; and (iv) the key must be kept completely secret by both parties. However, secure key exchange is a challenge, especially when using OTP. Because each key must only be used once, provisioning the keys becomes both tedious and a potential weak point in the security.

As described herein, a privacy table (e.g., a table of entropy) can be used to generate keys. One approach to create a key using a privacy table includes: (1) selecting a point in the privacy table; (2) determining which bits to extract for the key (e.g., the key spans multiple cells in the table); (3) creating the key and a key map that describes for the receiver how to recreate the key; (4) encrypting the plaintext message with the key to generate a cypher text; and (5) sending the key map and the cyphertext to the receiver. In this example, the receiver recreates the key using the key map and the receiver's copy of the privacy table, then uses the recreated key to decrypt the cyphertext.

As an example, some autonomous vehicles (e.g., drones) and landing stations (also sometimes called docking or control stations) use barcodes to identify one another (e.g., two-dimensional barcodes such as QR codes). However, a problem with static barcodes is that the codes can be copied and used in an unauthorized manner (e.g., to introduce an unauthorized drone or landing station into a system). Dynamic electronic barcodes (e.g., OTP barcodes) help protect against copying, particularly if the dynamic barcodes are generated using truly random numbers.

For example, when a drone and landing station connect, each can display a QR code on its (e-paper) display that contains an encrypted authentication message. The QR code can be generated from a shared privacy table as described in detail later. Both the landing station and the drone can then decrypt the respective authentication messages and verify that the other is authorized. Additionally, after each is authenticated, additional secure messages can be exchanged using OTP. However, if, for example, the drone fails to authenticate the docking station, it can be programmed to fly away and/or delete its memory (effectively disabling the drone). In situations with multiple drones, each additional drone can have a respective privacy table and be provisioned to the docking station. In these situations, the docking station stores multiple privacy tables and may have to try several privacy tables in order to authenticate a particular drone.

An example authentication message from a drone can include one or more of: the drone serial number, the current status, and the amount of data to be transferred. An example authentication message from a landing station can include one or more of: the station serial number, the wireless password, and one or more commands.

Turning now to the figures, FIG. 1 is a block diagram of a secure communication system 100 (e.g., a secure communication network) in according to some embodiments. The secure communication system 100 includes a plurality of devices (e.g., electronic devices, such as devices 110, 120, 130, and 140) that can communicate with each other securely. The secure communication system 100 includes an electronic device 110, an electronic device 120, and a secure log 112. In some embodiments, the secure communication system 100 includes additional devices, such as electronic devices 130 and 140, that can communicate with other devices in the secure communication system 100. In this example, the electronic device 110 is shown as being able to communicate with a plurality of devices (e.g., devices 120, 130, or 140).

In some embodiments, data transmitted to and/or from the electronic device 110 is stored in a secure log 112. In some embodiments, the secure log 112 is a blockchain ledger that is used to record all data that is sent and/or received at the electronic device 110. In some embodiments, the secure log 112 is a permissioned blockchain network. In some embodiments, the secure log 112 is stored at another electronic device that is distinct from the electronic device 110. For example, the secure log 112 may be stored at a computer system or at a server system.

A secure communication system 100 may include any number of devices and be directed towards any field of application. For example, a secure communication system 100 may include one or more IoT devices such as smart phones, smart appliances (e.g., a smart refrigerator or a smart thermostat), smart fire alarm, smart door bell, smart lock, smart machines (e.g., smart cars, smart bicycles, or smart scooters), smart wearable devices (e.g., smart fitness trackers or smart watches), smart lighting (e.g., smart light bulbs or smart plugs), smart assistant devices, and smart security systems (e.g., smart cameras, smart pet monitors, or smart baby monitors). For instance, a user with a smart phone may have applications that are in communication with a smart refrigerator, a smart thermostat, one or more smart bulbs, and a smart watch. Each of these smart devices (e.g., IoT devices) is able to communicate with the smart phone via a secure communication system 100 using the methods described herein.

Figure 2:
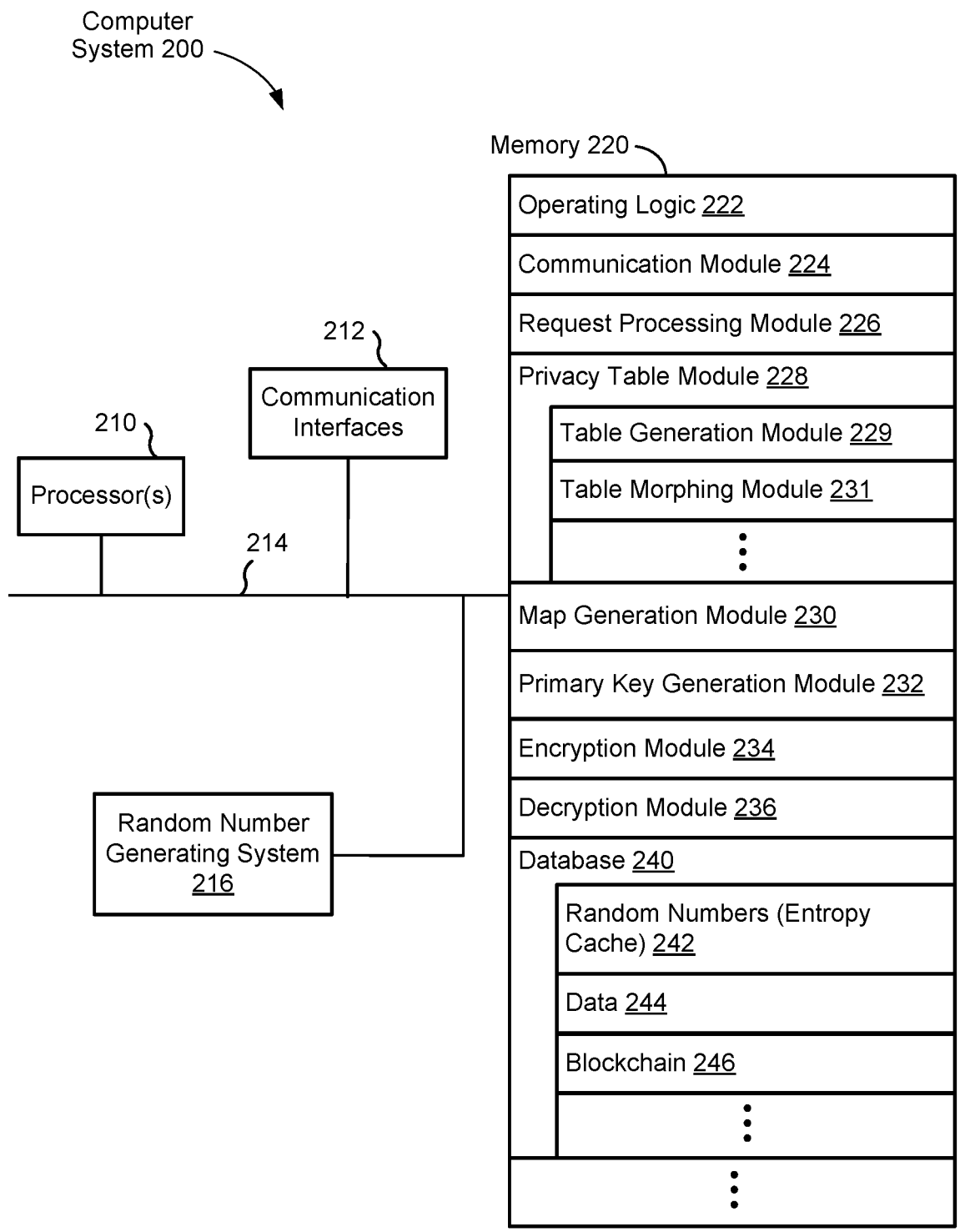
FIG. 2 is a block diagram of an example electronic device of a secure communication system in accordance with some embodiments.

FIG. 2 is a block diagram of a computer system 200 in accordance with some embodiments. In some embodiments, the electronic device 110 in FIG. 1 is an instance of the computer system 200. The computer system 200 includes one or more processors 210 (e.g., CPUs, microprocessors, or processing units), a communication interface 212, memory 220, and one or more communication buses 214 for interconnecting these components (sometimes called a chipset). In some embodiments, the computer system 200 includes, or is in communication with, a random number generating system 216, which is configured to generate random numbers and provide the random numbers to the computer system 200 (e.g., to devices of the computer system, such as electronic device 110). In some embodiments, the random number generating system 216 includes a random number generating device and one or more modules for controlling the random number generating device and recording the generated random numbers. For example, the random number generating device may be a physical random number generating device and the one or more modules may include an image processor for processing images from the physical random number generating device. An example of a random number generating device is disclosed in U.S. patent application Ser. No. 16/823,286, filed Mar. 18, 2020, which is incorporated by reference herein in its entirety.

In some embodiments, the memory 220 in the computer system 200 includes high-speed random-access memory, such as DRAM, SRAM, DDR SRAM, or other random-access solid-state memory devices. In some embodiments, the memory includes non-volatile memory, such as one or more magnetic disk storage devices, one or more optical disk storage devices, one or more flash memory devices, or one or more other non-volatile solid state storage devices. The memory, or alternatively the non-volatile memory within memory, includes a non-transitory computer-readable storage medium. In some embodiments, the memory, or the non-transitory computer-readable storage medium of the memory, stores the following programs, modules, and data structures, or a subset or superset thereof:

operating logic 222, including procedures for handling various basic system services and for performing hardware dependent tasks;

a communication module 224, which couples to and/or communicates with remote devices and remote systems (e.g., a random number generation system 216, a database 240, and/or other wearable, IoT, or smart devices) in conjunction with the communication interfaces 212;

a request processing module 226, which processes requests for random number generation;

a privacy table module 228, which manages privacy tables (also referred to as tables of entropy or entropy tables). In some embodiments, the privacy table module 228 generates, stores, morphs, and transmits tables. In some embodiments, the privacy table module 228 includes:

a table generation module 229, which generates privacy tables (e.g., including random numbers) based on information received from the random number generating system 216. In some embodiments, a privacy table is generated using entropy blocks that include random numbers; and a table morphing module 231, which morphs the privacy tables in accordance with a morph agreement (e.g., a predefined hashing algorithm). In some embodiments, the table morphing module 231 maintains and/or removes privacy table versions in accordance with the morph agreement (or user or system preferences);

a map generation module 230, which generates maps (e.g., encoding/decoding maps) based on the privacy table;

a primary key generation module 232, which generates primary keys based on maps and the privacy table. In some embodiments, generating a primary key includes applying a digest function to a string;

an encryption module 234, which encrypts messages (e.g., data or text) to be transmitted. For example, the encryption module 234 may encrypt patient information prior to transmitting the patient information to an electronic device 120 that is in communication with a device (such as the electronic device 110) of the computer system 200. In some embodiments, the encryption module 234 uses a primary key that is generated by the primary key generation module 232 to encrypt a message;

a decryption module 236, which decrypts messages (e.g., data or text) received from other devices that are in communication with devices of the computer system 200. For example, the decryption module 236 is able to generate (e.g., recreate) the relevant primary key based on the received information, and uses the primary key to decrypt the message; and a database 240, which stores:

random numbers 242 that were previously generated (e.g., stored as a sequence of 8-bit bytes, 64-bit blocks, or 256-bit blocks). This is also referred to as an entropy cache. In some embodiments, entropy within a privacy table is not reused;

data 244 sent and/or received by devices (such as the electronic device 110) of the computer system 200. In some embodiments, the data 244 is transmitted to a secure log 112; and blockchain information (e.g., ledger(s)) 246 for privacy tables obtained (e.g., generated or received) via the privacy table module 228.

In some embodiments, the computer system 200 is a computing device that executes applications (e.g., entropy applications) to process data (e.g., random numbers) from the random number generation system 216. In some embodiments, the computer system 200 sends instructions to the database 240 using a communication interface 212, to retrieve random numbers 242 (e.g., from the entropy cache). In response to receiving the instructions, the database 240 may return random numbers 242 via the interface 212. In some embodiments, the random numbers 242 stored in the database 240 are associated with the one or more random numbers generated by the random number generating system 216.

The computer system 200 can be implemented as any kind of computing device, such as an integrated system-on-a-chip, a microcontroller, a console, a desktop or laptop computer, a server computer, a tablet, a smart phone, or other mobile device. Thus, the computer system 200 includes components common to typical computing devices, such as a processor, random access memory, a storage device, a network interface, an I/O interface, and the like. The processor may be or include one or more microprocessors or application specific integrated circuits (ASICs). The memory may include RAM, ROM, DRAM, SRAM, and MRAM, and may include firmware, such as static data or fixed instructions, BIOS, system functions, configuration data, and other routines used during the operation of the computing device and the processor. The memory also provides a storage area for data and instructions associated with applications and data handled by the processor.

The storage device provides non-volatile, bulk, or long-term storage of data or instructions in the computing device. The storage device may take the form of a magnetic or solid-state disk, tape, CD, DVD, or other reasonably high capacity addressable or serial storage medium. Multiple storage devices may be provided or are available to the computing device. Some of these storage devices may be external to the computing device, such as network storage or cloud-based storage. The network interface includes an interface to a network and can be implemented as either a wired or a wireless interface. The I/O interface connects the processor to peripherals (not shown) such as sensors, displays, cameras, color sensors, microphones, keyboards, and/or USB devices.

Attention is now directed towards embodiments of secure transmission of data between devices of the secure communications system 100.

Figure 3A:
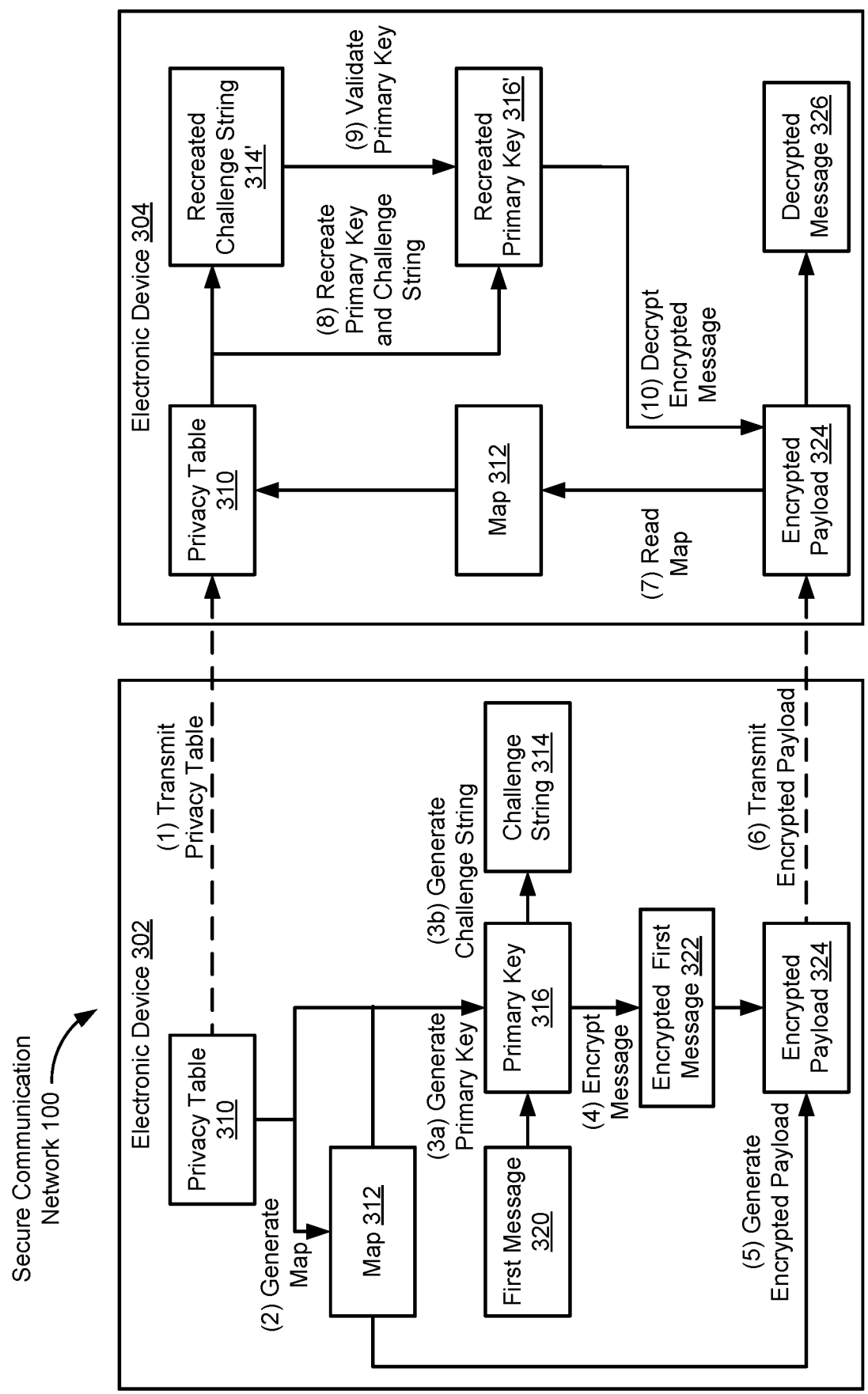
FIGS. 3A and 3B illustrate secure communication between two devices of a secure communication system in accordance with some embodiments.
Figure 3B:
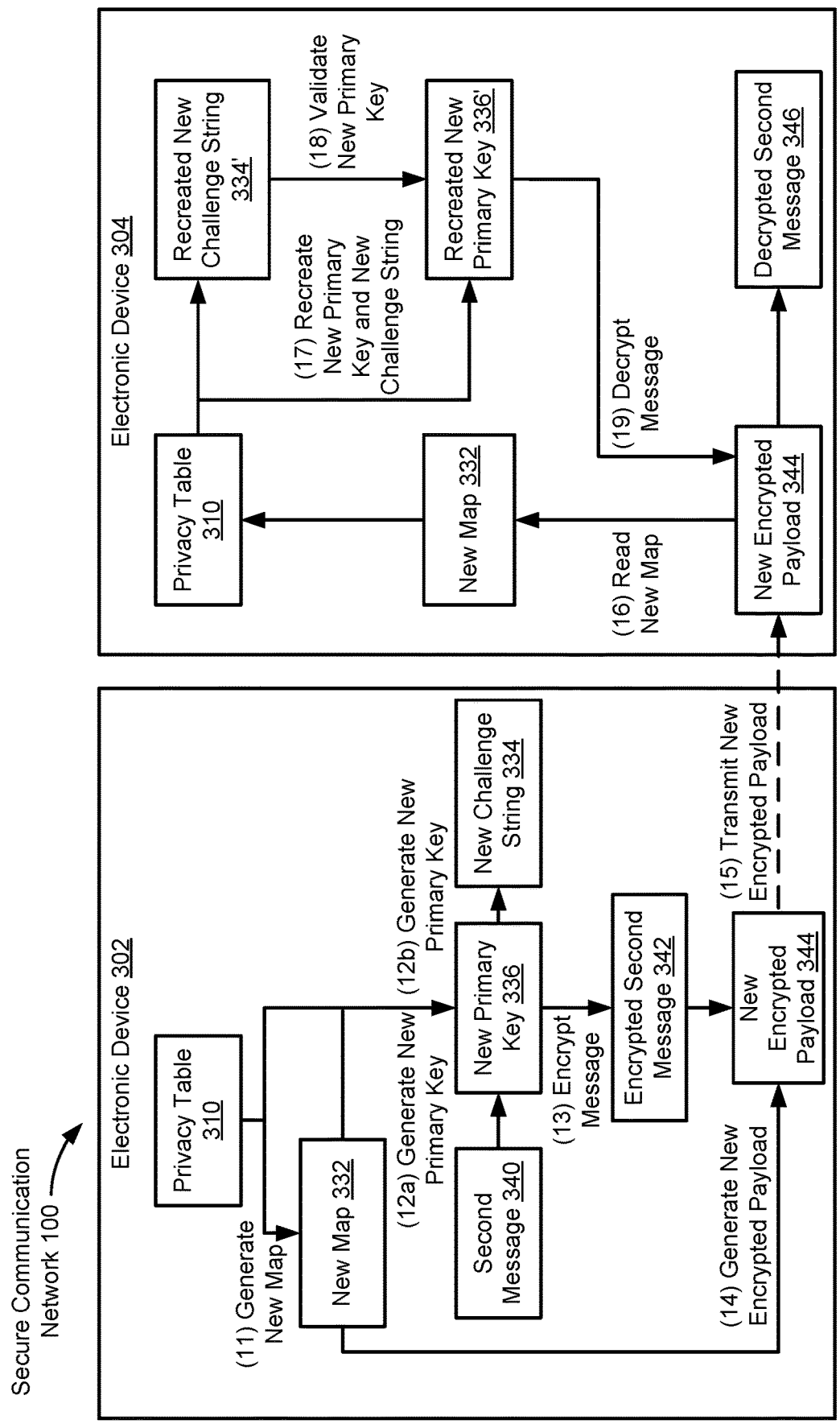
Figure 3C:
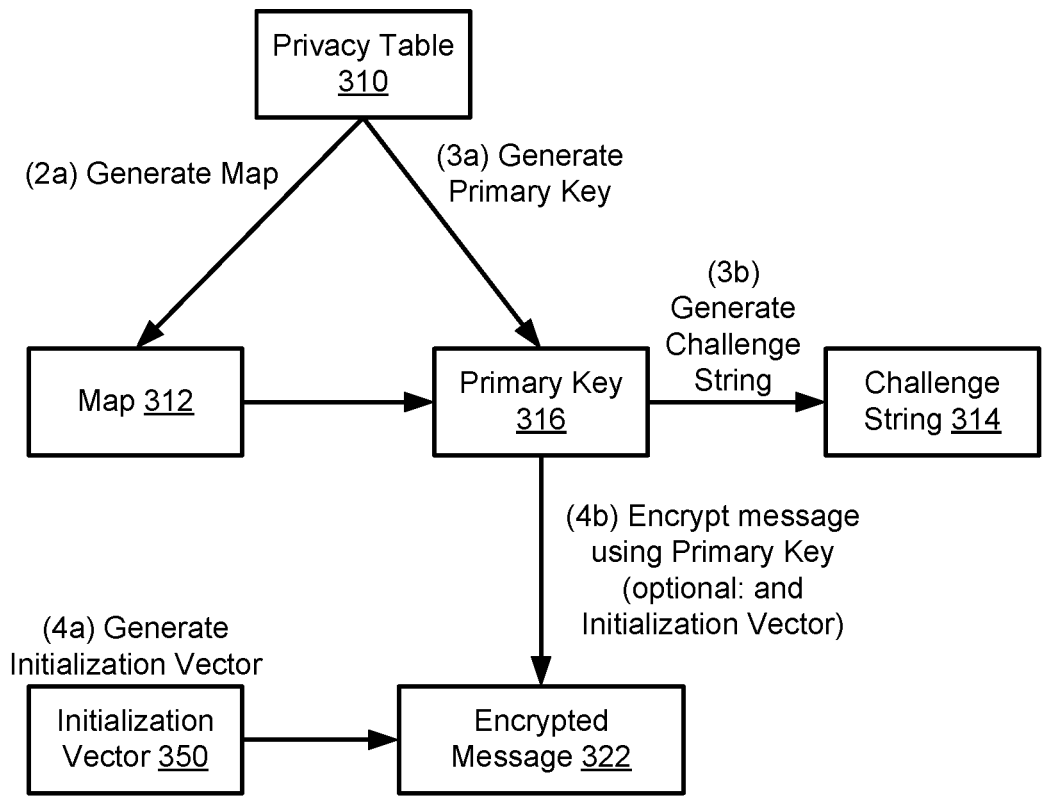
FIG. 3C illustrates generating a primary key based on a map and a privacy table in accordance with some embodiments.

FIGS. 3A-3C illustrate secure communication between two devices (e.g., electronic devices 302 and 304, two devices that are distinct from one another) of a secure communication system 100, according to some embodiments. Each of the electronic devices 302 and 304 may be an instance of the electronic devices 110, 120, 130, or 140, or an electronic device associated with the secure log 112 shown in FIG. 1. For example, the first electronic device 302 may correspond to the first electronic device 110 and the second electronic device 304 may correspond to the second electronic device 120, or vice versa. In another example, the first electronic device 302 may correspond to the first electronic device 110 and the second electronic device 304 may correspond to an electronic device that is part of a computer system or server system that stores the secure log 112, or vice versa.

When the secure communication system 100 includes a medical network, each of the electronic devices 302 and 304 may correspond to any of: a patient device, a device of the remote monitoring system, a device associated with the database, or a device associated with a health care provider (e.g., a doctor, a clinic, or a hospital). When the secure communication system 100 includes a drone network, each of the electronic devices 302 and 304 may correspond to any of: a drone, a landing station, a control station, or a device associated with a drone facility.

The electronic device 302 stores a privacy table 310 (e.g., a table of entropy) consisting of random bits. The electronic device 302 transmits (operation 1) the privacy table 310 to the electronic device 304 over an encrypted channel, and the electronic device 304 stores the transmitted privacy table 310. The electronic device 302 generates (operation 2) a map 312 (e.g., an encoding/decoding map 312) and generates (operation 3a) a primary key 316 (e.g., an encryption key) based on the map 312 (e.g., values in the map 312) and the random numbers (e.g., bits) stored in the privacy table 310. In some embodiments, the electronic device 302 also generates (operation 3b) a challenge string 314 based on the primary key 316 (e.g., the challenge string 314 is derived from the primary key 316). In some embodiments, the challenge string 314 is transmitted from the electronic device 302 to the electronic device 304 separately from any of the map 312, the primary key 316, and an encrypted message (e.g., transmitted out-of-band), and is used by the electronic device 304 to validate that the primary key 316 is correctly recreated and that the transmitted information can be trusted. In some embodiments, the electronic device 302 applies a digest function (such as SHA256) to the primary key 316 to generate (operation 3b) the challenge string 314. For example, the primary key 316 is a digest, such as a SHA256 digest, of the challenge string 314.

In some embodiments, the map 312 includes information regarding how to use the privacy table 310 to generate the primary key 316 and/or the challenge string 314. For example, values in the map 312 correspond to any of: a starting position in the privacy table, an offset value, and a read direction. Additional details regarding the map 312 are provided below with respect to FIGS. 4A and 4B. In some embodiments, the map 312 is generated using a subset or a portion (less than all) of the random numbers (e.g., bits) stored in the privacy table 310. In some embodiments, the primary key 316 and the challenge string 314 are generated using a subset or a portion (less than all) of the random numbers (e.g., bits) stored in the privacy table 310. In some embodiments, the map 312 does not include information (e.g., an identifier) regarding which privacy table it is associated with (e.g., generated from).

The electronic device 302 encrypts (operation 4) a first message 320 (e.g., data) using the primary key 316 to form an encrypted first message 322. For example, the electronic device 302 may use a symmetric cipher, such as AES-256

(which is a symmetric cipher that encrypts in blocks of 256 bits), to encrypt the first message 320. The electronic device 302 generates (operation 5) an encrypted payload 324 (also referred to as ciphertext) that includes the map 312 and the encrypted first message 322. In some embodiments, the encrypted payload 324 includes the map 312 prepended to the encrypted first message 322. In some embodiments, such as when a symmetric cipher is used, the primary key 316 is a symmetric key (e.g., the same primary key can be used to encrypt the message to form an encrypted message and to decrypt the encrypted message to recreate the original message). Examples of the encrypted payload 324 are provided with respect to FIGS. 4A and 4B. Examples of symmetric ciphers include (without limitation): AES, Blowfish, RC4, Twofish, Serpent, Camellia, Salsa20, ChaCha20, CAST5, Kuznyechik, DES, 3DES, Skipjack, Safer, and IDEA. In some embodiments, the cipher used to encrypt the message is determined (e.g., selected) based on the period of time for which the information stored in the message is required to remain secure. For example, if information stored in an encrypted message expires (e.g., becomes irrelevant) within 30 seconds, a first symmetric cipher (e.g., RC4) may be used to encrypt the message. In contrast, if information stored in an encrypted message is required to remain secure for a long period of time (e.g., months, years, or permanently) a different symmetric cipher may be used to encrypt the message.

The electronic device 302 transmits (operation 6) the encrypted payload 324 (which includes the map 312 and the encrypted first message 322) to the electronic device 304. Because the message is encrypted, the transmission need not be over an encrypted or secure channel. The encrypted payload 324 is transmitted (in operation 6) at a different time from the time of transmission of the privacy table 310 (in operation 1). For example, the encrypted payload 324 is transmitted subsequent to transmission of the privacy table 310 (e.g., the privacy table 310 is transmitted as part of a payload that is distinct from the encrypted payload 324).

The electronic device 304 receives the encrypted payload 324 (which includes the map 312 and the encrypted first message 322) from the electronic device 302 and reads (e.g., extracts or determines) (operation 7) the map 312 (e.g., an encoding/decoding map) from the encrypted payload 324. The electronic device 304 then uses the information from the map 312 and the privacy table 310 to recreate (operation 8) the challenge string 314 (e.g., to generate a recreated challenge string 314') and the primary key 316 (e.g., to generate a recreated primary key 316'). In some embodiments, the challenge string 314 is derived from the primary key 316 (and thus, the recreated challenge string 314' can be derived from the recreated primary key 316'). In some embodiments, the recreated challenge string 314' is the same as (e.g., identical to) the challenge string 314. The electronic device 304 uses the recreated challenge string 314' to validate (operation 9) the primary key 316 (e.g., to generate a recreated primary key 316') and uses the recreated primary key 316' to decrypt (operation 10) the encrypted first message 322 in the encrypted payload 324 to form the decrypted first message 326. The electronic device 302 then initializes a decryption protocol (e.g., a decryption algorithm, such as AES256), which corresponds to the encryption protocol used to encrypt the message, using the recreated primary key 316' and decrypts the encrypted first message 322 to form the decrypted first message 326.

In some embodiments, the recreated primary key 316' is the same as (e.g., identical to) the primary key 316. For example, in some embodiments, such as when the first message 320 is encrypted using a symmetric cipher (such as AES-256), the encrypted first message 322 can be decrypted using a recreated primary key 316' that is identical to the primary key 316 used to encrypt the first message 320 to form the encrypted first message 322.

In some embodiments, the process described in FIG. 3A (e.g., operations 2 through 10) are repeated for each new message sent from the electronic device 302 to the electronic device 304. As shown in FIG. 3B, for transmission of a second message 340, the electronic device 302 generates a new map 332 (e.g., encoding/decoding map 332) for the second message 340 such that the second message 340 is encrypted based on (e.g., using) a new primary key 336 that is different (e.g., distinct) from the primary key 316 used for encrypting the first message 320 (e.g., previously sent messages). The process described in FIG. 3A (e.g., operation 1 through 10) is cipher agnostic and can be conducted using any encryption protocol (and any decryption protocol).

FIG. 3B illustrates a process of securely transmitting a second message 340, distinct from the first message 320, from the electronic device 302 to the electronic device 304. The electronic device 302 generates (operation 11) a new map 332 (e.g., an encoding/decoding map 332) that is different (e.g., distinct) from the map 312. The electronic device 302 also generates (operation 12a) a new primary key 336 (e.g., an encryption key) based on the map 312 and the random numbers (e.g., bits) stored in the privacy table 310. In some embodiments, the electronic device 302 generates (operation 12b) a new challenge string 334 from the primary key 336. Since the new map 332 is different from the map 312, the new primary key 336 is different (e.g., distinct) from the primary key 316, and the new challenge string 334 is different (e.g., distinct) from the challenge string 314.

The electronic device 302 encrypts (operation 13) the second message 340 (e.g., data) using the new primary key 336 to form an encrypted second message 342. The electronic device 302 generates (operation 14) a new encrypted payload 344 that includes the new map 332 and the encrypted second message 342. In some embodiments, the new encrypted payload 344 includes the map 332 prepended (or appended) to the encrypted second message 342.

The electronic device 302 transmits (operation 15) the new encrypted payload 344 (which includes the new map 332 and the encrypted second message 342) to the electronic device 304 (e.g., over an encrypted channel). The new encrypted payload 344 is transmitted (in operation 15) at a different time from a time of transmission of the privacy table 310 (in operation 1) and at a different time from a time of transmission of the encrypted payload 324 (in operation 6).

The electronic device 304 receives the new encrypted payload 344 (which includes the new map 332 and the encrypted second message 342) from the electronic device 302 and reads (e.g., extracts or determines) (operation 16) the new map 332 from the new encrypted payload 344. The electronic device 304 then uses the information from the new map 332 and the privacy table 310 to recreate (operation 17) the new primary key 336 (e.g., generate a recreated new primary key 336'). In embodiments where the electronic device 304 receives a new challenge string 334, the electronic device 304 uses the information from the new map 332 to recreate the challenge string 334 (e.g., generate a recreated challenge string 334'). In some embodiments, the electronic device 304 uses the recreated challenge string 334' to validate (operation 18) the new primary key 336. The electronic device 304 uses the recreated primary key 336' to decrypt (operation 19) the second encrypted message 342 in the new encrypted payload 344 to form a decrypted second message 346.

In some embodiments, the electronic device updates the privacy table 310 with a new privacy table. The new privacy table can be transmitted using the secure message transmission process described above with respect to FIGS. 3A and 3B.

In some embodiments, the privacy tables, such as the privacy table 310, are generated by the random number generating system 216. In some embodiments, the privacy tables are generated by the computer system 200 (e.g., by a device of the computer system 200, such as electronic device 302) using random numbers generated by the random number generating system 216. In some embodiments, generating the privacy table includes determining the number of required keys for a predefined period of time and determining the size of the privacy table based on the number of required keys. In some embodiments, the predefined period of time corresponds to a time interval (e.g., predefined time interval) for replenishing the privacy table. The size of a new privacy table may be the same or may be different from the size of the old privacy table (e.g., the same if the needs are the same, or different if the expected needs are different). In some embodiments, the privacy table stored at devices (such as the devices 302 and 304) of the secure communication system 100 is updated (e.g., replenished) at predefined intervals (e.g., after a predefined period of time). In some embodiments, updating the privacy table includes updating (e.g., replenishing) the entire privacy table (e.g., replace all random numbers (e.g., bits) stored in the privacy table with new random numbers (e.g., new bits)). In some embodiments, updating the privacy table includes updating (e.g., replenishing) a subset or portion (less than all) of the random numbers (e.g., bits) in the privacy table. In some embodiments, only random numbers (e.g., bits) that have been used (e.g., that have been read) are replaced (e.g., replenished) and other numbers stored in the privacy table that have not been used remain unchanged.

FIG. 3C illustrates generating a primary key 316 based on a map (e.g., the encoding/decoding map 312) and a privacy table (e.g., the privacy table 310), according to some embodiments. The map 312 is generated (operation 2a) based on random numbers (e.g., bits) stored in the privacy table 310. In some embodiments, generating the map 312 includes identifying a start position within the privacy table 310 and a read direction (e.g., spin). In some embodiments, the start position is randomly selected (e.g., using a pseudo-random number generator). In some embodiments, the read direction is randomly selected (e.g., using a pseudo-random number generator). The map 312 is generated by reading the random numbers (e.g., bits) in the privacy table 310 starting at the start location and reading the random numbers (e.g., bits) stored in the privacy table 310 in the read direction.

The primary key 316 is generated (operation 3a) based on values in the map 312 (e.g., the random numbers that make up the map 312) and the random numbers (e.g., bits) stored in the privacy table 310. In some embodiments, a challenge string 314 (operation 3b) is generated based on (e.g., is derived from) the primary key 316. The primary key 316 is used to encrypt (operation 4b) a message. For example, to encrypt a message, the electronic device 302 may initialize an encryption protocol (e.g., an encryption algorithm, such as AES256) that uses the primary key 316 to encrypt the message and form an encrypted message.

In some embodiments, the process of securely transmitting an encrypted message 322 includes generating (operation 4a) an initialization vector 350 and using the initialization vector 350 in conjunction with the primary key 316 to encrypt the message 320. For example, when the transmitted message 322 is part of a live stream that includes continuous transmission of a plurality of messages (or a continuous transmission of a plurality of payloads 324), each message is encrypted using a unique primary key 316. In some embodiments, this also includes a unique initialization vector 350. In some embodiments, the initialization vector 350 (when included) is automatically updated (e.g., a new initialization vector 350 is automatically created) for each new message 320 to by encrypted.

In some embodiments, the electronic device 302 shares a specific privacy table with no more than one device (e.g., shares the privacy table 310 with only one electronic device 304). In such cases, if the electronic device 302 needs to securely communicate with a plurality of different devices (e.g., with the electronic device 304 as well as at least one other electronic device that is distinct from the electronic device 304) the electronic device 302 stores a plurality of privacy tables such that messages transmitted to different devices are encrypted based on (e.g., using) different privacy tables. For example, a primary key used to encrypt a message to be transmitted to the electronic device 302 is generated based on a map and a first privacy table, and a primary key used to encrypt a message (which may be the same message or a different message) to be transmitted to another electronic device that is distinct from the electronic device 302 is generated based on a map and a second privacy table that is distinct from the first privacy table. In some embodiments, the electronic device 302 shares the same privacy table with more than one device. For example, the electronic device 302 may share the same privacy table with the electronic device 304 and two other devices. In such cases, all of the devices that store the privacy table (e.g., the electronic device 302, the electronic device 304, and the two other devices) may communicate securely with one another via the secure communication process described above with respect to FIGS. 3A-3C.

Figure 4A:
FIG. 4A illustrates an example of an encrypted payload in accordance with some embodiments.

FIG. 4A illustrates an example of an encrypted payload 324, according to some embodiments. In FIG. 4A, the encrypted payload 324-A includes the encrypted first message 322 and the map 312. For example, the encrypted payload 324-A is a concatenation of the encrypted first message 322 and the map 312. Values (e.g., numerical values) in the map 312 are presented in FIG. 4A by the letters "A" through "G". The map 312 is prepended to the encrypted first message 322 in FIG. 4A in accordance with some embodiments.

In some embodiments, the map 312 is used to generate a challenge string 314, and thus includes a plurality of values that correspond to instructions or directions on how to use a privacy table to generate (or recreate) the challenge string. For example, the map 312 includes one or more of:

- a random value (e.g., a numerical value) corresponding to a starting point within the privacy table, represented by the letter "A";
- a value (e.g., a numerical value) corresponding to a horizontal offset from the starting point within the privacy table, represented by the letter "B";
- a value (e.g., a positive or negative value) corresponding to a horizontal read direction from the starting point within the privacy table;
- a value (e.g., a numerical value) corresponding to a vertical offset from the starting point within the privacy table, represented by the letter "C";

a value (e.g., a positive or negative value) corresponding to a vertical read direction from the starting point within the privacy table;

a value (e.g., a numerical value) corresponding to a size (e.g., a permutation of a size) of the privacy table in a horizontal direction, represented by the letter "D";

a value (e.g., a numerical value) corresponding to a size (e.g., a permutation of a size) of the privacy table in a vertical direction, represented by the letter "E";

a value (e.g., a numerical value) corresponding to a starting point within the privacy table (e.g., within the permutation), represented by the letter "F". In some embodiments, the value corresponding to the starting point within the privacy table is bounded by the size of the privacy table. In some embodiments, the value corresponding to the starting point within the privacy table is generated by a pseudo-random number generator; and the length of a challenge string that is used to generate the primary key, represented by the letter "G". In some embodiments, the length of the challenge string is based on the size of the primary key (which may be, for example, 246 bits of 32 bytes in length).

In some embodiments, the random value "A," is generated (e.g., provided) by a pseudo-random number generator. In some embodiments, the random value "A," is selected from a set of values that are determined based on the size of the privacy table 310. For example, when the privacy table 310 is a 2-dimensional matrix having a size of 100 by 50 (e.g., "D"=100 and "E"=50) and storing a total of 5,000 values, $0 \leq A \leq 5,000$.

A privacy table 310 can include any number of random numbers. In some embodiments, a privacy table 310 consists of as few as 256 bits. In some embodiments, the privacy table 310 includes 10,000 random bits or more. In some embodiments, the size of the privacy table 310 is determined based on the expected use of the privacy table. For example, if the privacy table 310 has an expected use of a few seconds (e.g., as part of a process for encrypting speech between two parties), a privacy table 310 that has a small size is adequate.

For a privacy table 310 that includes 10,000 bits, generating a map 312 may include any of:

obtaining a random value "A" using a pseudo-random number generator, where $1 \leq A \leq 10,000$. In this example, A=2,544;

obtaining a random value "B" corresponding to a horizontal offset from the starting point within the privacy table, where $1 \leq B \leq 10,000$. In some embodiments, "B" is obtained via a pseudo-random number generator;

obtaining a randomly determined direction corresponding to a horizontal read direction (e.g., a positive read direction or a negative read direction);

obtaining a random value "C" corresponding to a vertical offset from the starting point within the privacy table, where $1 \leq C \leq 10,000$. In some embodiments, "C" is obtained via a pseudo-random number generator;

obtaining a randomly determined direction corresponding to a vertical read direction (e.g., a positive read direction or a negative read direction);

computing a horizontal permutation value "D", which corresponds to the size of the privacy table 310 in the horizontal direction. For example, the horizontal permutation value is determined (e.g., calculated) by permuting over all values between 1 and the size of the privacy table in the horizontal direction; and computing a vertical permutation value "E", which corresponds to the size of the privacy table 310 in the vertical direction. For example, the vertical permutation value is determined (e.g., calculated) by permuting over all values between 1 and the size of the privacy table in the vertical direction.

Figure 4B:
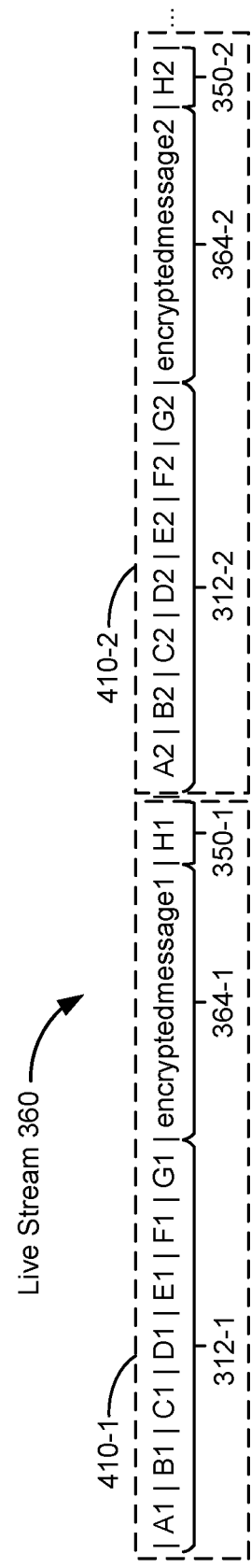
FIG. 4B provides an example of an encrypted live stream in accordance with some embodiments.

FIG. 4B provides an example of a live stream 360, according to some embodiments. The live stream 360 includes a plurality of encrypted payloads 410, which are sent sequentially (e.g., in order) with one another. Each encrypted payload 410 of the plurality of encrypted payloads includes a respective encrypted message 364, which corresponds to a portion of the live stream 360, and a respective map 312 (represented by the letters "A" through "G"), which corresponds to a respective primary key 316 used for the respective encrypted message 364. In some embodiments, the encrypted payloads 410 include a respective initialization vector 350 (represented by "H"), which is used in combination with the respective primary key 316 to form the respective encrypted message 364. This example shows transmission of two encrypted messages 364-1 and 364-2, which correspond to the first two messages of the live stream 360. Transmission of a first payload 410-1 (e.g., an encrypted payload) includes the first encrypted message 364-1 ("encryptedmessage1"), and a map 312-1 (e.g., an encoding/decoding map) corresponding to the first encrypted message 364-1 (e.g., "A1" through "G1," each representing numerical values as described with respect to FIG. 4A). In some embodiments, the first payload 410-1 includes an initialization vector 350-1 corresponding to the first encrypted message 364-1 (e.g., "H1"). For example, the encrypted payload 410-1 (also referred to as ciphertext) is a concatenation of the encrypted message 364-1, the map 312-1, and the optional initialization vector 350-1. In some embodiments, as shown, the map 312-1 is prepended to the encrypted first message 364-1. In some embodiments, the optional initialization vector 350-1 is appended to the encrypted first message 364-1 (e.g., the optional initialization vector 350-1 is added to the end of or after the encrypted message 364-1).

A second payload 410-2 (e.g., an encrypted payload) that directly follows the first payload 410-1 is transmitted (and ideally, received) sequentially to transmission (and reception) of the first payload 410-1. Transmission of the second payload 410-2 includes the second encrypted message 364-2 ("encryptedmessage2"), and a map 312-2 (e.g., an encoding/decoding map) corresponding to the second encrypted message 364-2 (e.g., "A2" through "G2," each representing numerical values as described with respect to FIG. 4A). In some embodiments, the second payload 410-2 also includes an initialization vector 350-2 corresponding to the second encrypted message 364-2 (e.g., "H2"). Additional messages 364 of the live stream 360 can be continually sent (and received) in this manner until the end of the live stream 360.

Thus, in some embodiments, the process of encrypting a message that is part of a live stream includes generating the initialization vector 350, generating a challenge string 314, and generating a primary key 316. An example of an initialization vector 350, if used for encrypting messages in a live stream, is "58, 148, 100, 27, 59, 184, 8, 236, 189, 24, 21, 6, 113, 162, 244, 26, 59, 72, 222, 95, 188, 247, 143, 118, 97, 168, 187, 147, 24, 153, 96, 130," an example of the challenge string 312 is "FFFBFCCFEFFADAF-FFFFBFFEFFFCEFFFF," and an example of the primary key 316 is "186, 3, 235, 211, 177, 202, 35, 167, 225, 195, 16, 151, 164, 71, 93, 47, 2, 114, 233, 26, 143, 119, 31, 103, 185, 88, 203, 62, 3, 43, 175, 85."

FIG. 5 illustrates an example secure communication system 100 with a drone and landing station in accordance with some embodiments. The secure communication system 100 in FIG. 5 includes a drone 502 (e.g., an electronic device 302) and a landing station 508 (e.g., an electronic device 304). The drone 502 includes a drone sensor 506 (e.g., a camera or optical sensor) and a drone electronic barcode 504 (e.g., a two-dimensional barcode such as a QR code). The landing station 508 includes a station sensor 510 (e.g., a camera or optical sensor) and a station electronic barcode 512. In accordance with some embodiments, each of the sensors 506 and 510 is configured to identify and scan the respective barcodes 504 and 512. In some embodiments, each electronic barcode 504 and 512 is configured to display an encrypted payload (e.g., the encrypted payload 324). In some embodiments, an encrypted payload presented via the drone electronic barcode 504 includes an identifier for the drone 502. In some embodiments, an encrypted payload presented via the station electronic barcode 512 includes an identifier for the landing station 508. In some embodiments, the encrypted payloads presented via the electronic barcodes 504 and 512 are encrypted using a shared privacy table (e.g., as will be discussed in more detail below with respect to FIGS. 6A and 6B).

Figure 6A:
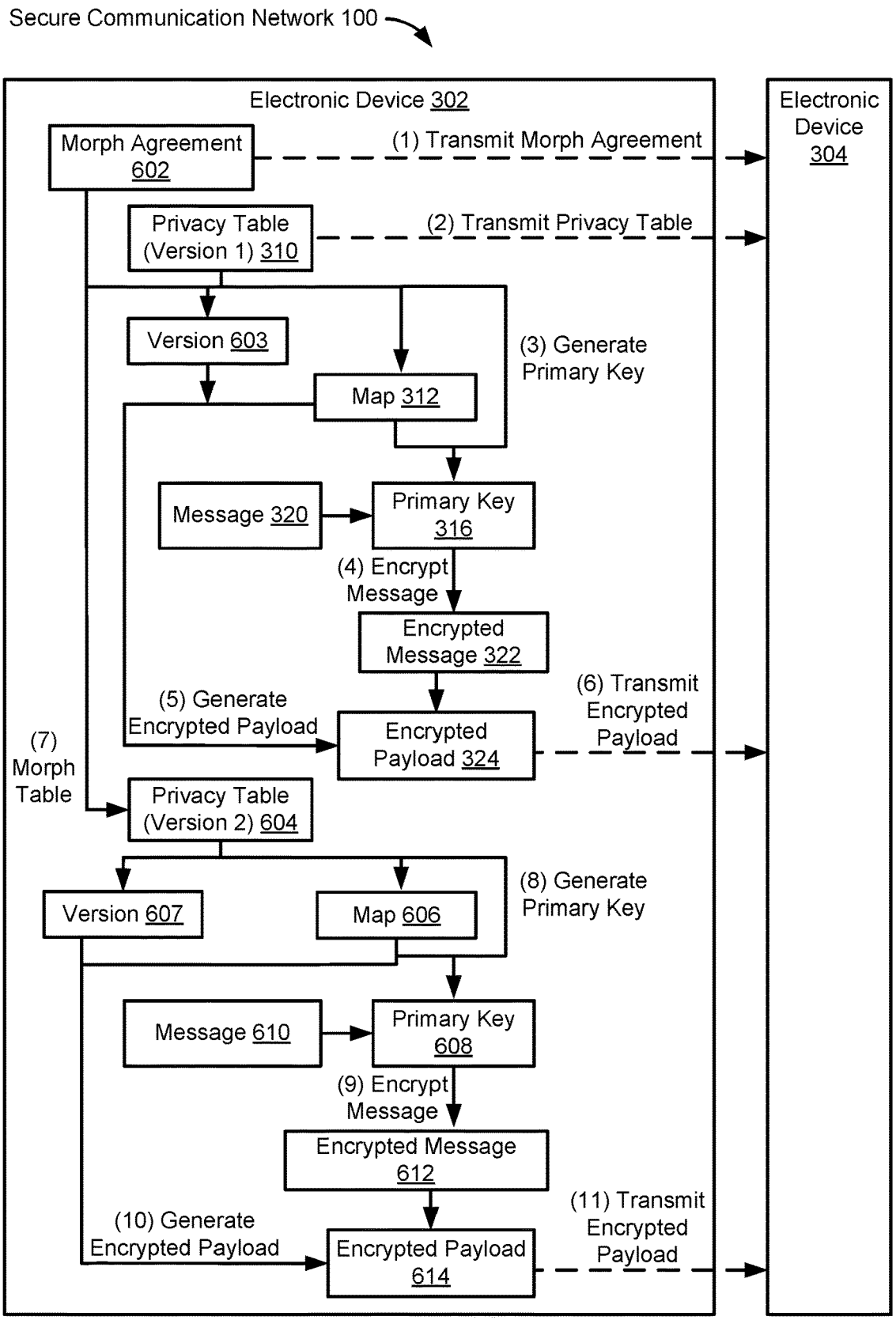
FIGS. 6A and 6B illustrate secure communication between two devices of a secure communication system in accordance with some embodiments.
Figure 6B:
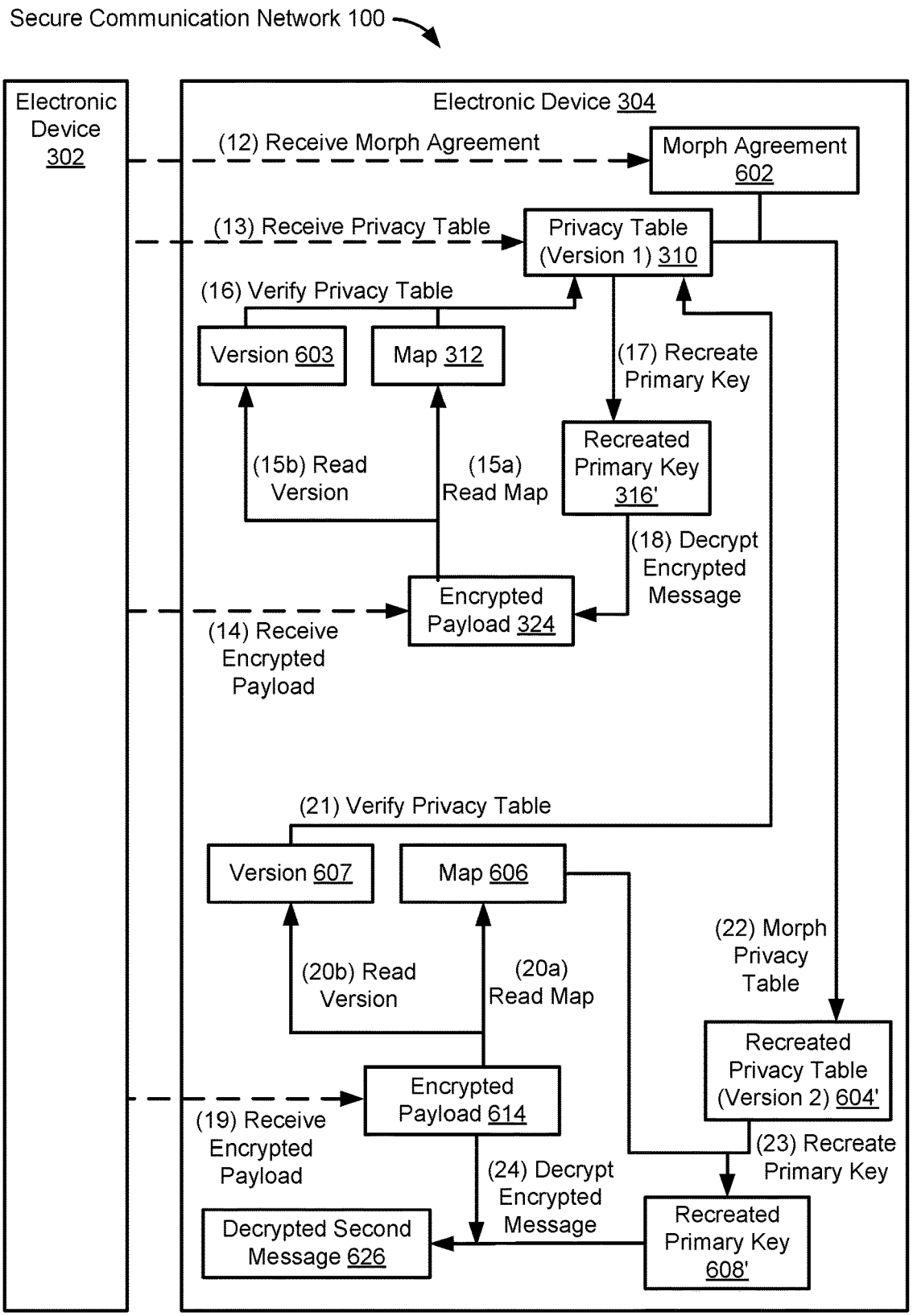

FIGS. 6A and 6B illustrate secure communication between two devices (e.g., electronic devices 302 and 304, two devices that are distinct from one another) of a secure communication system 100, according to some embodiments. FIG. 6A illustrates example operations occurring at the first electronic device 302 and FIG. 6B illustrates corresponding example operations occurring at the second electronic device 304.

As illustrated in FIG. 6A, the first electronic device 302 stores the privacy table 310 (e.g., a first version of a privacy table) composed of random bits and an associated morph agreement 602. In accordance with some embodiments, the morph agreement 602 includes instructions for morphing the privacy table 310. In some embodiments, the morph agreement 602 includes a predefined hashing algorithm (e.g., secure hash algorithm or a message-digest algorithm). In some embodiments, the morph agreement 602 includes information or instructions on how often to morph the privacy table 310 (e.g., based on elapsed time or the number of messages sent). In some embodiments, the morph agreement 602 includes one or more parameters that can be set by a user to adjust how the privacy table is morphed. For example, the user can request a morph of the privacy table and input a parameter value to set the type of hashing algorithm to be used to morph the privacy table.

In some embodiments, the first electronic device 302 stores a first version 603 for the privacy table 310 (e.g., the first version 603 indicates that the privacy table 310 is a first version of a generated privacy table). In some embodiments, the first version 603 is an indication of the number of times the privacy table has been morphed (e.g., it is a value initially set to 0 or 1). In some embodiments, the first version 603 is included with the privacy table 310 (e.g., the privacy table includes a value denoting its version in addition to the random bits). In some embodiments, the first version 603 is stored in a blockchain ledger (e.g., at the secure log 112) for the privacy table 310. In some embodiments, the first version 603 is not stored at the electronic device 302 (not included) and the privacy table 310 does not have an indicator denoting its version. In embodiments without the first version 603, a receiver (e.g., the second electronic device 304) morphs the privacy table until a primary key can be recreated (e.g., trial and error with different versions of the privacy table until a match is found).

The first electronic device 302 transmits (operation 1) the morph agreement 602 over an encrypted channel to the second electronic device 304. The second electronic device 304 separately transmits (operation 2) the privacy table 310 to the second electronic device 304 over an encrypted channel. In some embodiments, the first electronic device 302 transmits the morph agreement 602 and the privacy table 310 to the second electronic device 304 in the same transmission.

The first electronic device 302 generates (operation 3) a map 312 (e.g., an encoding/decoding map) and a primary key 316 (e.g., an encryption key) based on the map 312 (e.g., values in the map 312) and the random numbers (e.g., bits) stored in the privacy table 310. In some embodiments, the primary key 316 is a digest, such as an SHA256 digest, of a challenge string (e.g., as described previously with respect to FIG. 3A).

In some embodiments, the map 312 includes information regarding how to use the privacy table 310 to generate the primary key 316. For example, values in the map 312 may correspond to any of: a starting position in the privacy table, an offset value, and a read direction. Additional details regarding the map 312 are provided above with respect to FIGS. 4A and 4B. In some embodiments, the map 312 is generated using a subset or a portion, less than all, of the random numbers (e.g., bits) stored in the privacy table 310. In some embodiments, the primary key 316 is generated using a subset or a portion, less than all, of the random numbers (e.g., bits) stored in the privacy table 310. In some embodiments, the map 312 does not include information (e.g., an identifier) regarding which privacy table it is associated with (e.g., generated from).

The first electronic device 302 encrypts (operation 4) a first message 320 (e.g., data) using the primary key 316 to form an encrypted message 322. For example, the first electronic device 302 may use a symmetric cipher, such as AES-256 (which is a symmetric cipher that encrypts in blocks of 256 bits) to encrypt the message 320. The first electronic device 302 generates (operation 5) an encrypted payload 324 (also referred to as ciphertext), which includes the map 312 and the encrypted message 322, and, in some embodiments, the first version 603. In some embodiments, the encrypted payload 324 includes the map 312 (and the first version 603) prepended or appended to the encrypted message 322. In some embodiments, such as when a symmetric cipher is used, the primary key 316 is a symmetric key. Examples of the encrypted payload 324 are provided with respect to FIGS. 7A and 7B. In some embodiments, the cipher used to encrypt the message is determined (e.g., selected) based on the morph agreement 602. In some embodiments, the cipher used to encrypt the message is determined (e.g., selected) based on the period of time for which the information stored in the message is required to remain secure.

The first electronic device 302 transmits (operation 6) the encrypted payload 324 to the electronic device 304. Because the message is encrypted, the transmission need not be over an encrypted or secure channel. For example, in the context of a drone and landing station system, the encrypted payload 324 may be converted to a QR code that is visually displayed to the second electronic device 304. As illustrated in FIG. 6B, the encrypted payload 324 is transmitted (in operation 6) at a different time from a time of transmission of the morph agreement 602 (in operation 1) and the privacy table 310 (in operation 2). In some embodiments, the morph agreement 602 and the privacy table 310 are transmitted via a first channel (e.g., an encrypted Wi-Fi channel) and the encrypted payload 324 is transmitted via a second channel that is distinct from the first channel (e.g., an unencrypted optical channel).

After transmitting the encrypted payload 324, the first electronic device 302 morphs (operation 7) the privacy table 310 based on the morph agreement 602 to generate the second privacy table 604 (e.g., a second version of a privacy table). In some embodiments, the morph operation is performed in response to a user request. In some embodiments, the first electronic device 302 morphs the privacy table in response to a request of a user of the first electronic device 302. In some embodiments, the first electronic device 302 morphs the privacy table based on one or more of: the amount of time elapsed since the privacy table 310 was generated (or received by the first electronic device 302); the number of messages encrypted/transmitted using the privacy table 310; or one or more settings (e.g., user preferences). In some embodiments, the privacy table 310 is morphed using a hashing algorithm defined in the morph agreement 602. In some embodiments, only a portion of the privacy table 310 is morphed (e.g., the portion of the privacy table 310 corresponding to the map 312). In some embodiments, the first electronic device 302 stores a second version 607 for the second privacy table 604 (e.g., the second version 607 indicates that the second privacy table 604 is a second version of a generated privacy table). In some embodiments, the second version 607 includes information regarding the type of morphing that occurred to produce the second privacy table 604. For example, the morph agreement 602 includes parameters for the user to specify when performing a morph operation and the second version 607 includes information about the values set by the user for those parameters. In some embodiments, the second version 607 is not stored at the first electronic device 302 (not included) and the second privacy table 604 does not have an indicator denoting its version.

In some embodiments, after morphing the privacy table 310 to create the second privacy table 604, the privacy table 310 is deleted (or marked for deletion) by the electronic device 302. In some embodiments, the privacy table 310 is retained by the first electronic device 302 (e.g., to be used for messages received from the second electronic device 304 that were created with the privacy table 310 stored at the second electronic device 304). In some embodiments, the first electronic device 302 stores the first version of the privacy table 310 and the second version of the second privacy table 604 as blocks in a blockchain ledger (e.g., with the privacy table 310 as the genesis block). In some embodiments, the blockchain ledger includes the version information 603 and 607. In some embodiments, the blockchain ledger is stored at the secure log 112. In some embodiments, the blockchain ledger is stored at the database 240 (e.g., as the blockchain information 246).

In some embodiments, the process described above (e.g., operations 3 through 6) are repeated for each new message sent from the first electronic device 302 to the second electronic device 304 with the morphing operation (operation 7) occurring between at least some of the message transmissions.

The first electronic device 302 generates (operation 8) the map 606 (e.g., an encoding/decoding map) and the primary key 608 (e.g., an encryption key) based on the map 606 (e.g., values in the map 606) and the random numbers (e.g., bits) stored in the privacy table 604. In some embodiments, the second map 606 is distinct from the first map 312 (e.g., identifies different locations in the privacy table). In some embodiments, the second map 606 identifies the same locations as the first map 312, but the resulting second primary key 608 is distinct from the first primary key 316 due to the morphing of the table (in operation 7).

The first electronic device 302 encrypts (operation 9) a second message 610 (e.g., data) using the new primary key 608 to form an encrypted message 612. The first electronic device 302 generates (operation 10) a new encrypted payload 614 that includes the new map 606 and the encrypted message 612. In some embodiments, the new encrypted payload 614 includes the map 606 (and, in some embodiments, the second version 607) prepended or appended to the encrypted message 612.

The first electronic device 302 transmits (operation 11) the new encrypted payload 614 (which includes the new map 606 and the encrypted message 612) to the second electronic device 304 (e.g., via an optical barcode). The new encrypted payload 614 is transmitted (in operation 11) at a different time from the time of transmission the first encrypted payload 324 (in operation 6). In some embodiments, the first electronic device 302 awaits a response from the second electronic device 304 (e.g., a confirmation of receipt of the payload 614 and/or a confirmation of decryption of the payload 614). In some embodiments, in accordance with the second electronic device 304 not responding (e.g., within a preset amount of time), the first electronic device 302 reverts the second privacy table 604 to the privacy table 310 (e.g., to prevent mismatches in the event that the second electronic device 304 did not receive the payload 614 with parameters for morphing the privacy table).

As illustrated in FIG. 6B, the second electronic device 304 receives (operation 12) and stores the morph agreement 602 transmitted (in operation 1) from the first electronic device 302. The second electronic device 304 also receives (operation 13) and stores the privacy table 310 transmitted (in operation 2) from the first electronic device 302. As described previously, the morph agreement 602 and the privacy table 310 may be sent via an encrypted channel (e.g., that is distinct from the channel used to transmit the encrypted payloads).

The second electronic device 304 receives (operation 14) the first encrypted payload 324 (which includes the map 312, the encrypted message 322, and, in some embodiments, the first version 603) transmitted (in operation 6) from the first electronic device 302 and reads (e.g., extracts or determines) the map 312 (operation 15a) and, in some embodiments, the first version 603 (operation 15b) from the encrypted payload 324. In embodiments in which the encrypted message includes the first version 603, the second electronic device 304 verifies (operation 16) the version of its privacy table (e.g., privacy table 310) against the first version 603 to determine whether to morph the privacy table.

The second electronic device 304 uses the information from the map 312 and the privacy table 310 to recreate (operation 17) the primary key 316 (e.g., to generate a recreated primary key 316'). In some embodiments, the second electronic device 304 generates a challenge string and uses the recreated challenge string to validate the recreated primary key 316'. The second electronic device 304 uses the recreated primary key 316' to decrypt (operation 18) the encrypted message 322 from the encrypted payload 324 to form the decrypted first message 326.

In some embodiments, the recreated primary key 316' is the same as (e.g., identical to) the primary key 316. For example, in some embodiments, such as when the first message 320 is encrypted using a symmetric cipher (such as AES-256), the encrypted message 322 can be decrypted using the recreated primary key 316', which is identical to the primary key 316 used to encrypt the first message 320 to form the encrypted message 322.

At a later point in time, the second electronic device 304 receives (operation 19) the encrypted payload 614 (which includes the map 606, the encrypted message 612, and, in some embodiments, the second version 607) transmitted (in operation 11) from the first electronic device 302 and reads (e.g., extracts or determines) the map 606 (operation 20a) and, in some embodiments, the second version 607 (operation 20b) from the encrypted payload 614.

In embodiments in which the encrypted message includes the second version 607, the second electronic device 304 verifies (operation 21) the version of its privacy table (e.g., privacy table 310) against the second version 607 to determine whether to morph the privacy table 310. In these embodiments, the second electronic device 304 determines that the privacy table 310 is not the correct version and morphs (operation 22) the privacy table 310 using the morph agreement 602 to generate the recreated privacy table 604'. In some embodiments, the second version 607 includes information about how to morph the privacy table 310 (e.g., includes values for one or more parameters in the morph agreement 602). In some embodiments, the second version 607 includes information about the number of times to morph the privacy table 310. For example, the second version 607 indicates that the encrypted payload 614 was encrypted with version 2 of the privacy table and therefore the privacy table 310 should be morphed once.

In embodiments in which the encrypted message does not include the second version 607, the second electronic device 304 generates a primary key using the privacy table 310 and performs a validation for the generated primary key. For example, the second electronic device 304 uses the information from the map 606 and the privacy table 310 to generate a primary key. However, the primary key generated from the map 606 and the privacy table 310 is invalid (and does not decrypt the encrypted message). In some embodiments, the second electronic device 304 determines that the primary key is invalid by comparing a challenge string from the first electronic device 302 with a challenge string generated with the primary key (e.g., the challenge strings don't match and therefore the primary key is invalid). In some embodiments, the second electronic device 304 determines that the primary key is invalid based on a failure to decrypt the encrypted message. In response to determining that the primary key generated from the map 606 and the privacy table 310 is invalid, the second electronic device 304 morphs (operation 22) the privacy table 310 using the morph agreement 602 to generate the recreated privacy table 604'. In some embodiments, the second electronic device 304 repeats the validation described above to determine whether the primary key generated from the recreated privacy table 604' is valid.

The second electronic device 304 uses the information from the map 606 and the privacy table 604' to recreate (operation 23) the primary key 608 (e.g., to generate a recreated primary key 608'). The second electronic device 304 uses the recreated primary key 608' to decrypt (operation 24) the encrypted message 612 from the encrypted payload 614 to form the decrypted second message 626.

In some embodiments, the process described above (e.g., operations 19 through 24) are repeated for each new message sent from the electronic device 302 (or other devices with the shared privacy table 310) to the electronic device 304.

Figure 7A:
FIGS. 7A and 7B provide examples of encrypted payloads in accordance with some embodiments.
Figure 7B:
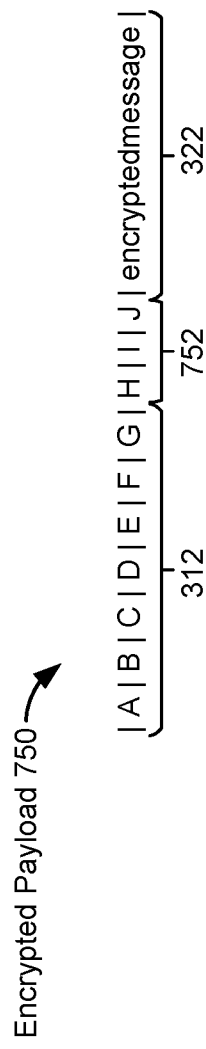

FIGS. 7A and 7B illustrate examples of encrypted payloads in accordance with some embodiments. In FIG. 7A, the encrypted payload 702 (e.g., corresponding to the encrypted payload 324) includes the encrypted message 322, the map 312, and version information 706. For example, the encrypted payload 702 is a concatenation of the encrypted message 322, the map 312, and the version information 706. The map 312 is described in detail above with respect to FIG. 4A. In some embodiments, as illustrated in FIG. 7A, the version information 706 includes a version number for the privacy table that corresponds to the map 312. In some embodiments, the version information 706 is included in the map 312 (e.g., the map 312 includes a value indicating the version of the corresponding privacy table).

In the example of FIG. 7B, the encrypted payload 750 includes version information 752. In some embodiments, the version information 752 includes one or more of: a version number for the corresponding privacy table and morphing information for generating the version of the privacy table. In some embodiments, the version information 752 includes one or more of:

a value (e.g., a numerical value) corresponding the version of the privacy table from which the map 312 was generated, represented by the letter "H";

a value (e.g., a numerical value) corresponding to the type of hash algorithm used for the morphing, represented by the letter "I"; and a value (e.g., a numerical value) corresponding to a portion of the privacy table that was morphed, represented by the letter "J".

In some embodiments, the values "I" and "J" correspond to inputs from a user of the electronic device 302 (e.g., user-selected values for parameters in the morph agreement 602).

Figure 7C:
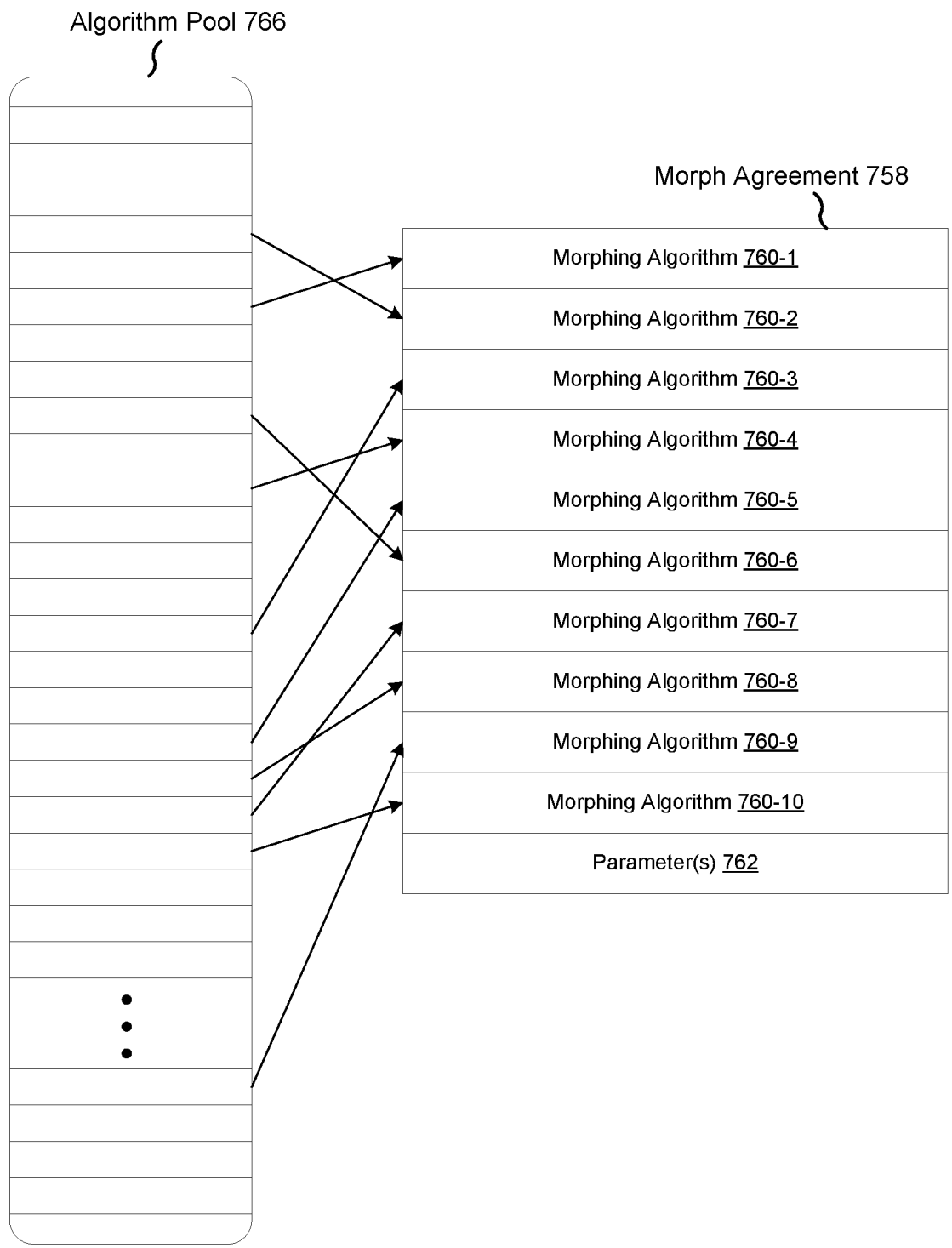
FIG. 7C provides an example morph agreement in accordance with some embodiments.

FIG. 7C illustrates a morph agreement 758 in accordance with some embodiments. In some embodiments, the morph agreement 602 is an instance of the morph agreement 758. The morph agreement 758 includes a plurality of morphing algorithms 760-1 through 760-10 and one or more parameters 762. In some embodiments, the plurality of morphing algorithms 760 are selected from an algorithm pool 766. In some embodiments, the plurality of morphing algorithms 760 include one or more distinct types of algorithms. In some embodiments, the morphing algorithms include one or more hashing algorithms (e.g., secure hash algorithms), one or more message-digest algorithms, and/or one or more cyphers. In some embodiments, the plurality of morphing algorithms 760 include one or more algorithms of a same type having different parameters. In some embodiments, the parameter(s) 762 include one or more parameters for morphing an associated privacy table (e.g., the privacy table 310). For example, the parameter(s) 762 include information and/or instructions on how often to morph the privacy table 310 (e.g., based on elapsed time or the number of messages sent).

In some embodiments, performing a morph operation on a privacy table includes selecting a morphing algorithm from the plurality of morphing algorithms 760. In some embodiments, the morphing algorithm is selected based on a user input. In some embodiments, the morphing algorithm is selected randomly (e.g., pseudo-randomly). In some embodiments, an identifier for the selected morphing algorithm is transmitted to a remote device (e.g., transmitted from the electronic device 302 to the electronic device 304). In some embodiments, the identifier is transmitted to the remote device as metadata for a secure message (e.g., along with a version number (e.g., the version 603) for the privacy table). In some embodiments, the identifier for the morphing algorithm (and optionally the version number) is sent separately from a secure message (e.g., in a separate communication and/or via a separate communication channel).

In some embodiments, the plurality of morphing algorithms 760 are refreshable from the algorithm pool 766. For example, after a particular number of morphs, a new set of morphing algorithms are obtained from the algorithm pool 766. As another example, a user may request a refresh of the plurality of morphing algorithms, resulting in a new set of algorithms being obtained from the algorithm pool 766.

Figure 8A:
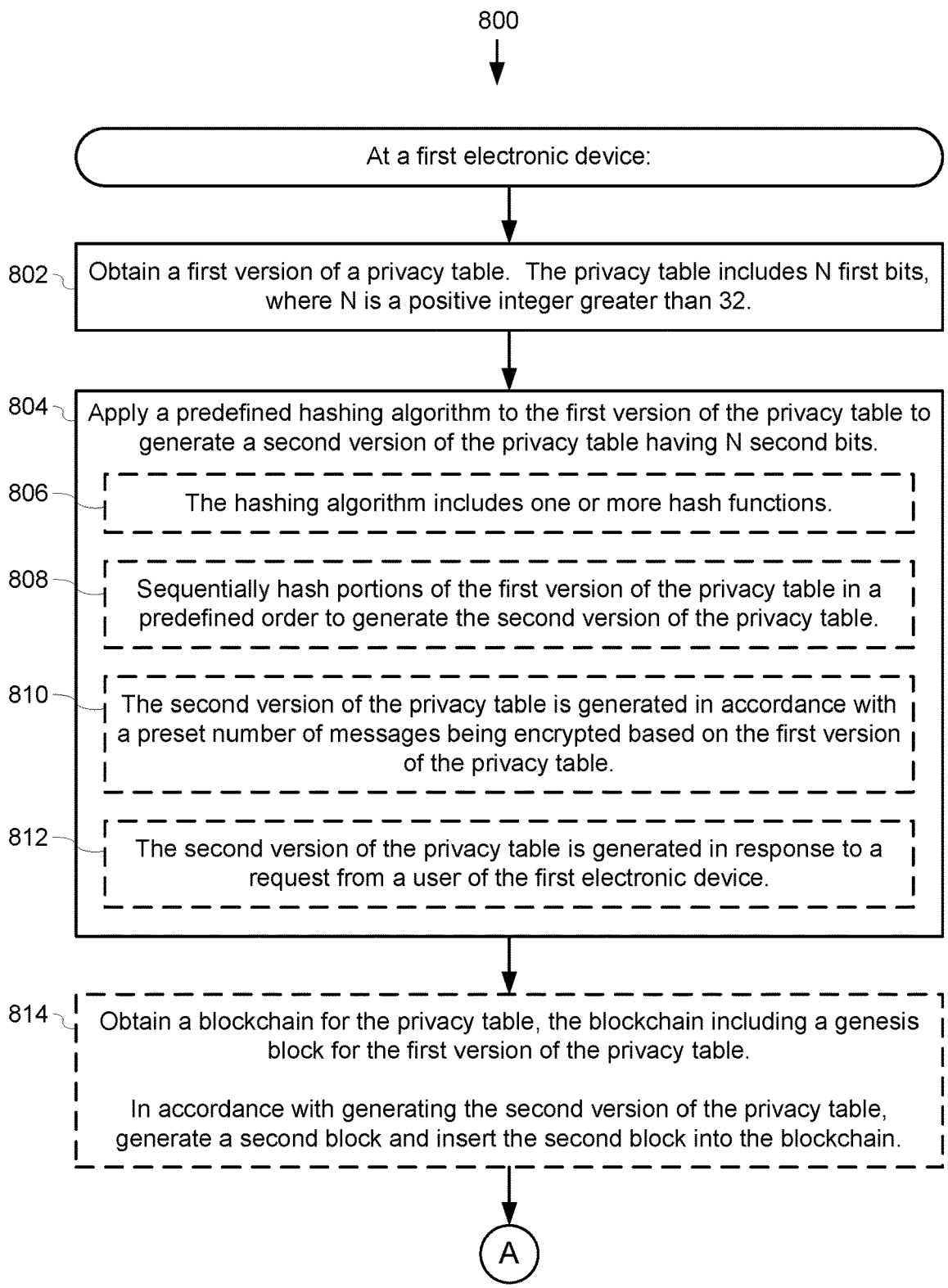
FIGS. 8A-8C provide a flowchart of a method for secure communications in accordance with some embodiments.
Figure 8B:
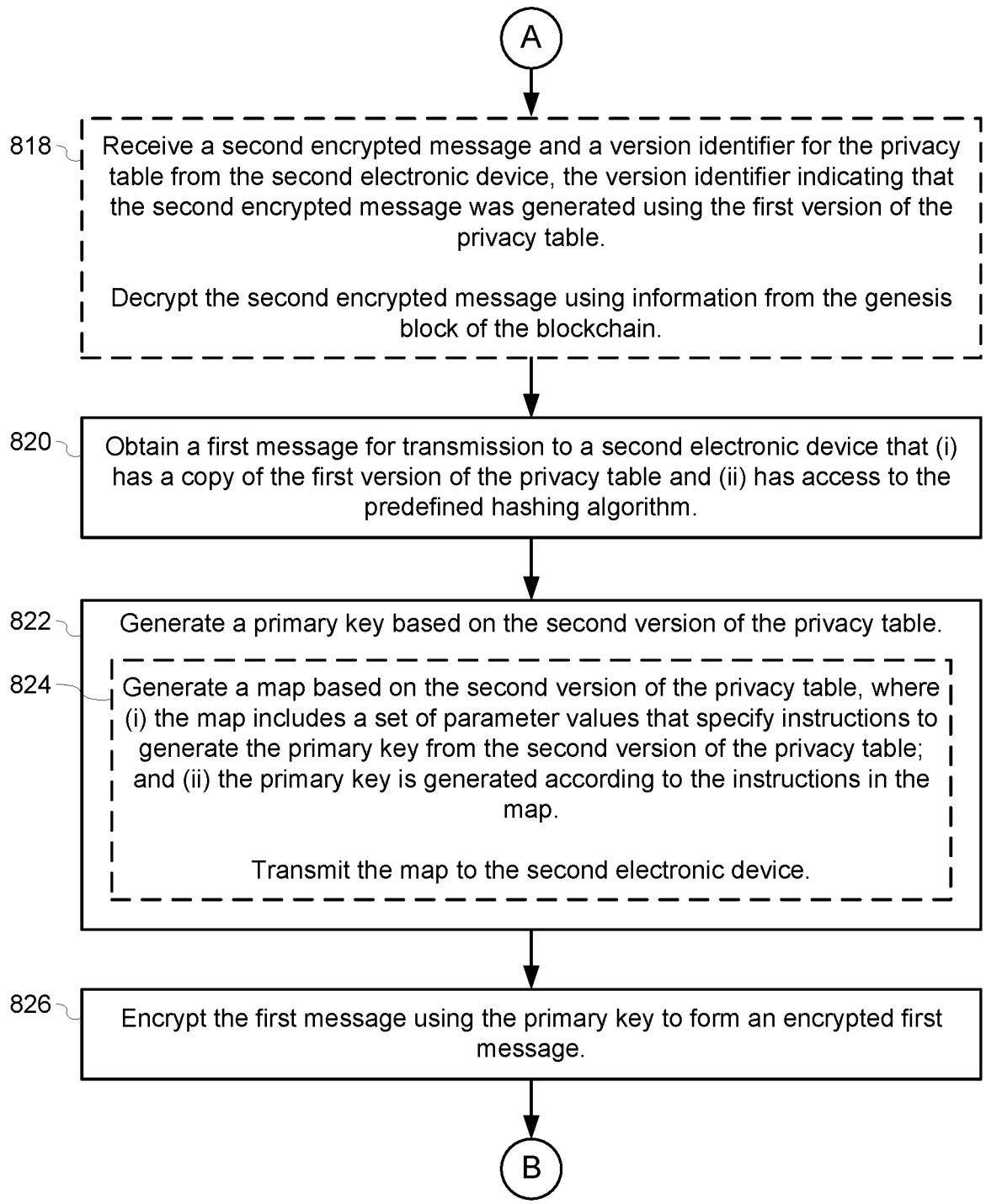
Figure 8C:
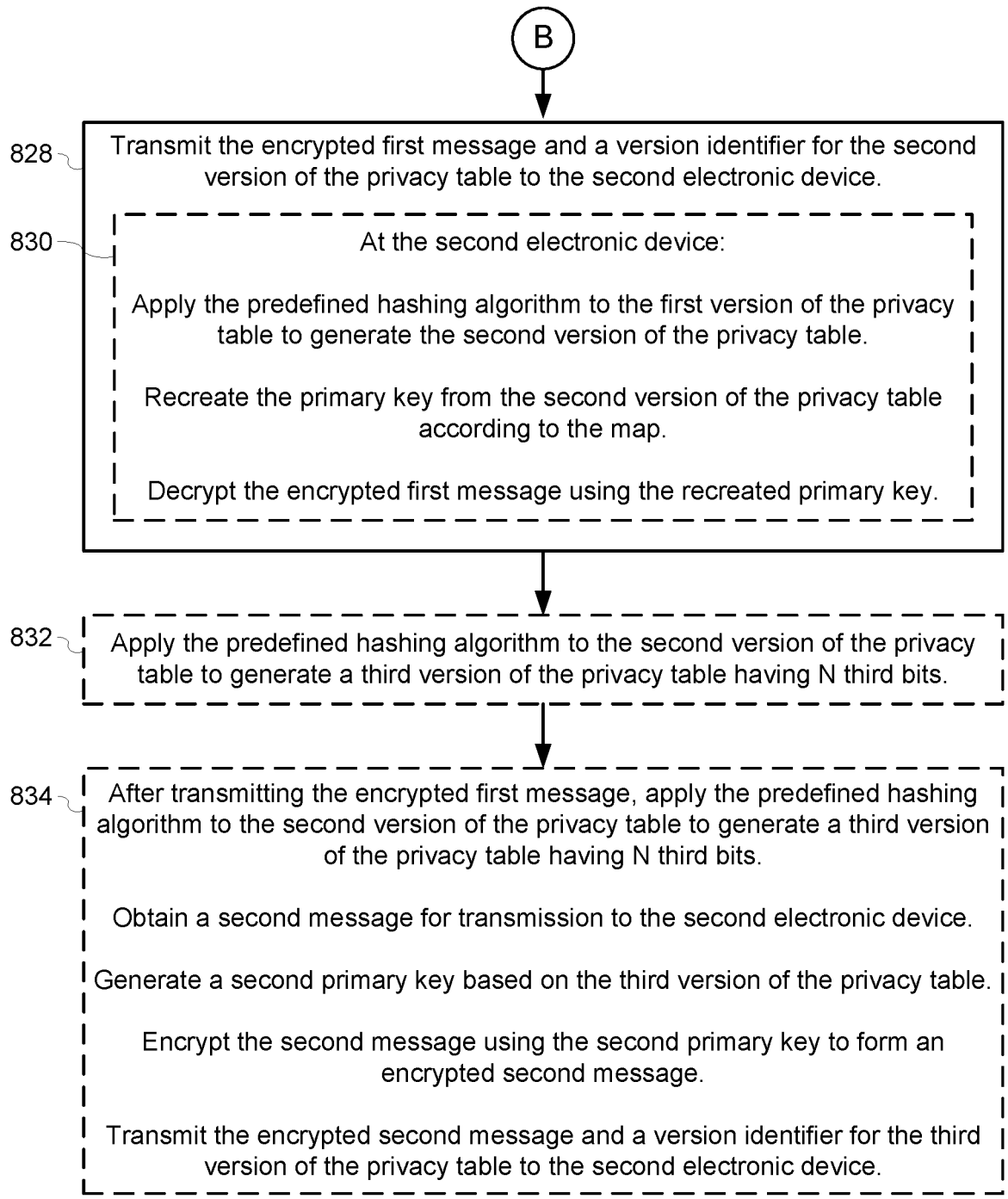

FIGS. 8A-8C provide a flowchart of a method 800 for secure communications (e.g., between devices of the secure communication system 100) in accordance with some embodiments. The method 800 is performed at a first electronic device (e.g., the electronic device 302). The first electronic device may correspond to any of the electronic devices shown in FIG. 1 (e.g., the electronic devices 110, 120, 130, or 140, or a device associated with the secure log 112) or any of the devices shown in FIG. 5 (e.g., a drone 502 or a landing station 508). An example of the secure communication between electronic devices of a secure communication system 100 is provided with respect to FIGS. 6A and 6B.

The first electronic device obtains (802) a first version of a privacy table. The privacy table includes N first bits, where N is a positive integer greater than 32. In some embodiments, the first electronic device receives the first version of the privacy table from a random number generating system (e.g., the random number generating system 216). In some embodiments, the first electronic device generates the first version of the privacy table (e.g., using the table generation module 229).

The first electronic device applies (804) a predefined hashing algorithm (e.g., via the table morphing module 231) to the first version of the privacy table to generate a second version of the privacy table having N second bits. In some embodiments, the second version of the privacy table has more, or less, than N bits. In some embodiments, the predefined hashing algorithm is (at least part of) a morph agreement (e.g., the morph agreement 602). In some embodiments, the predefined hashing algorithm (in the morph agreement) is obtained with the first version of the privacy table (e.g., is generated with the first version of the privacy table or obtained from a random number generating system with the first version of the privacy table). In some embodiments, the predefined hashing algorithm is generated in accordance with information from a second electronic device (e.g., the electronic device 304). For example, users of the first and second electronic devices may define (agree on) the morph agreement together.

In some embodiments, the hashing algorithm includes (806) one or more hash functions. In some embodiments, the hashing algorithm includes two or more hash functions (e.g., applying one or more of them each time the privacy table morphs). In some embodiments, the hashing algorithm selects which hash function to apply based on input from a user of the first electronic device (e.g., the user specifies which hash function to apply for a given morph of the privacy table).

In some embodiments, the first electronic device sequentially hashes (808) portions of the first version of the privacy table in a predefined order to generate the second version of the privacy table. In some embodiments, the predefined order is specified in a morph agreement. In some embodiments, the portions of the first version of the privacy table are less than the entirety of the privacy table. For example, the hashing algorithm is applied to only a subset of the privacy table in accordance with a morph agreement. In some embodiments, the hashing algorithm is applied to only portions of the privacy table that were used previously to generate a key (e.g., portions that correspond to the map 312).

In some embodiments, the second version of the privacy table is (810) generated in accordance with a preset number of messages being encrypted based on the first version of the privacy table. For example, a morph agreement for the privacy table may dictate that each version of the privacy table be used for only 1, 5, or 10 messages. In some embodiments, the second version is generated in accordance with a preset amount of the privacy table being used (e.g., when 25%, 50%, or 75% of the privacy table has been used in the generation of keys).

In some embodiments, the second version of the privacy table is (812) generated in response to a request from a user of the first electronic device. For example, a user of the first electronic device may request a new version of the privacy table due to security concerns, or in accordance with a security policy for communication with the second electronic device.

In some embodiments, the first electronic device obtains (814) a blockchain for the privacy table (e.g., from the secure log 112 or the blockchain information 246). The blockchain includes a genesis block for the first version of the privacy table. In accordance with generating the second version of the privacy table, the first electronic device generates (814) a second block and inserts the second block into the blockchain. In some embodiments, each version of the privacy table corresponds to a block in the blockchain.

In some embodiments, the first electronic device (i) receives (818) a second encrypted message and a version identifier for the privacy table from the second electronic device, the version identifier indicating that the second encrypted message was generated using the first version of the privacy table. The first electronic device then (ii) decrypts (818) the second encrypted message using information from the genesis block of the blockchain. For example, when the second message is based on the first version of the privacy table, the first electronic device retrieves the first version of the privacy table from a blockchain database (or generates the first version of the privacy table based on information from the blockchain).

The first electronic device obtains (820) a first message for transmission to a second electronic device that (i) has a copy of the first version of the privacy table and (ii) has access to the predefined hashing algorithm. For example, the first electronic device obtains the first message from a user of the first electronic device (e.g., via the communication interfaces 212). In some embodiments, the first message is obtained from a messaging application running on the first electronic device. In some embodiments, the first electronic device generates the first message in response to an incoming communication or event. For example, the first electronic device generates the first message in response to a request to identify itself to a remote device.

The first electronic device generates (822) a primary key based on the second version of the privacy table (e.g., using the primary key generation module 232). In some embodiments, the primary key is generated based on a subset (map) of the privacy table values.

In some embodiments, the first electronic device generates (824) a map based on the second version of the privacy table (e.g., via the map generation module 230), where (i) the map includes a set of parameter values that specify instructions to generate the primary key from the second version of the privacy table and (ii) the primary key is generated according to the instructions in the map. The first electronic device then transmits (824) the map to the second electronic device. For example, the map is transmitted to the second electronic device along with the encrypted message (e.g., the map and encrypted message are transmitted as the encrypted payload 324).

In some embodiments, generating the map based on the privacy table includes selecting a location in the privacy table, selecting a read direction (e.g., spin), and generating the map based on values (e.g., bits or random numbers) stored in the privacy table starting at the selected location and reading values stored in the privacy table in accordance with the selected read direction. In some embodiments, the location (e.g., start location) in the privacy table is randomly selected. In some embodiments, the read direction is randomly selected. In some embodiments, the location in the privacy table is selected based on a value provided via a pseudo-random number generator. In some embodiments, the read direction is selected based on a value provided via a pseudo-random number generator. For example, a pseudo-random number generator may provide a pseudo-random number such as "−129," which corresponds to a starting position of 129 in the privacy table and a negative read direction (e.g., read values in the privacy table starting at position 129 and reading backwards (e.g., read right to left)). In another example, a pseudo-random number generator may provide a pseudo-random number such as "+8," which corresponds to a starting position of 8 in the privacy table and a positive read direction (e.g., read values in the privacy table starting at position 8 and reading forwards (e.g., read left to right)).

In some embodiments, generating the map based on the privacy table includes using a subset or a portion (less than all) of the random numbers (e.g., bits) stored in the privacy table 310 to generate the map. In some embodiments, the map does not include information (such as an identifier) regarding which privacy table it is associated with or generated from. In some embodiments, the map comprises random numbers from the privacy table. In some embodiments, the map includes a random value corresponding to a starting point within the privacy table, a value corresponding to a horizontal offset from the starting point within the privacy table, a value corresponding to a horizontal read direction from the starting point within the privacy table, a value corresponding to a vertical offset from the starting point within the privacy table, a value corresponding to a vertical read direction from the starting point within the privacy table, a value corresponding to the size (e.g., a permutation of a size) of the privacy table in the horizontal direction, a value corresponding to the size (e.g., a permutation of a size) of the privacy table in the vertical direction, a value corresponding to a starting point within the permutation, and/or the length of a challenge string that is used to generate the primary key. In some embodiments, the length of the challenge string is derived from the value corresponding to a permutation of the size of the privacy table in the horizontal direction and the value corresponding to a permutation of the size of the privacy table in the vertical direction.

In some embodiments, generating a primary key based on the map and the privacy table includes generating a challenge string based on the map (e.g., based on values in the map, based on random numbers in the map), and applying a digest function to the challenge string to form the primary key. In some embodiments, the primary key is a digest, such as a SHA256 digest, of a challenge string (e.g., as described previously with respect to FIG. 3A).

The first electronic device encrypts (826) the first message (e.g., via the encryption module 234) using the primary key to form an encrypted first message (e.g., the encrypted message 322). For example, to encrypt a message, the first electronic device may initialize an encryption protocol (e.g., an encryption algorithm, such as AES256), which uses the primary key to encrypt the first message and form the encrypted first message.

The first electronic device transmits (828) the encrypted first message and a version identifier for the second version of the privacy table to the second electronic device (e.g., via the communication module 224). In some embodiments, the first electronic device presents the encrypted first message for the second electronic device. For example, the first electronic device presents the encrypted first message as a barcode for the second electronic device to scan. In some embodiments, the first electronic device transmits the encrypted first message via an unencrypted (unsecured) channel.

In some embodiments, the second electronic device: (i) applies (830) the predefined hashing algorithm to the first version of the privacy table to generate the second version of the privacy table (e.g., operation 22 in FIG. 6B); (ii) recreates (830) the primary key from the second version of the privacy table according to the map (e.g., operation 23 in FIG. 6B); and (iii) decrypts (830) the encrypted first message using the recreated primary key (e.g., operation 24 in FIG. 6B). In some embodiments, the second electronic device generates the second version of the privacy table based on information from a morph agreement (e.g., the morph agreement 602).

In some embodiments, the first electronic device applies (832) the predefined hashing algorithm to the second version of the privacy table to generate a third version of the privacy table having N third bits. In some embodiments, the first electronic device applies the predefined hashing algorithm in a different manner to generate the third version as compared to the second version. For example, the first electronic device applies a different hash function of the predefined hashing algorithm, applies the predefined hashing algorithm with a different value for a parameter of the algorithm, and/or applies the algorithm to a different portion of the privacy table.

In some embodiments, after transmitting the encrypted first message, the first electronic device: (i) applies (834) the predefined hashing algorithm to the second version of the privacy table to generate a third version of the privacy table having N third bits; (ii) obtains (834) a second message for transmission to the second electronic device; (iii) generates (834) a second primary key based on the third version of the privacy table; (iv) encrypts (834) the second message using the second primary key to form an encrypted second message; and (v) transmits (834) the encrypted second message and a version identifier for the third version of the privacy table to the second electronic device.

Figure 9:
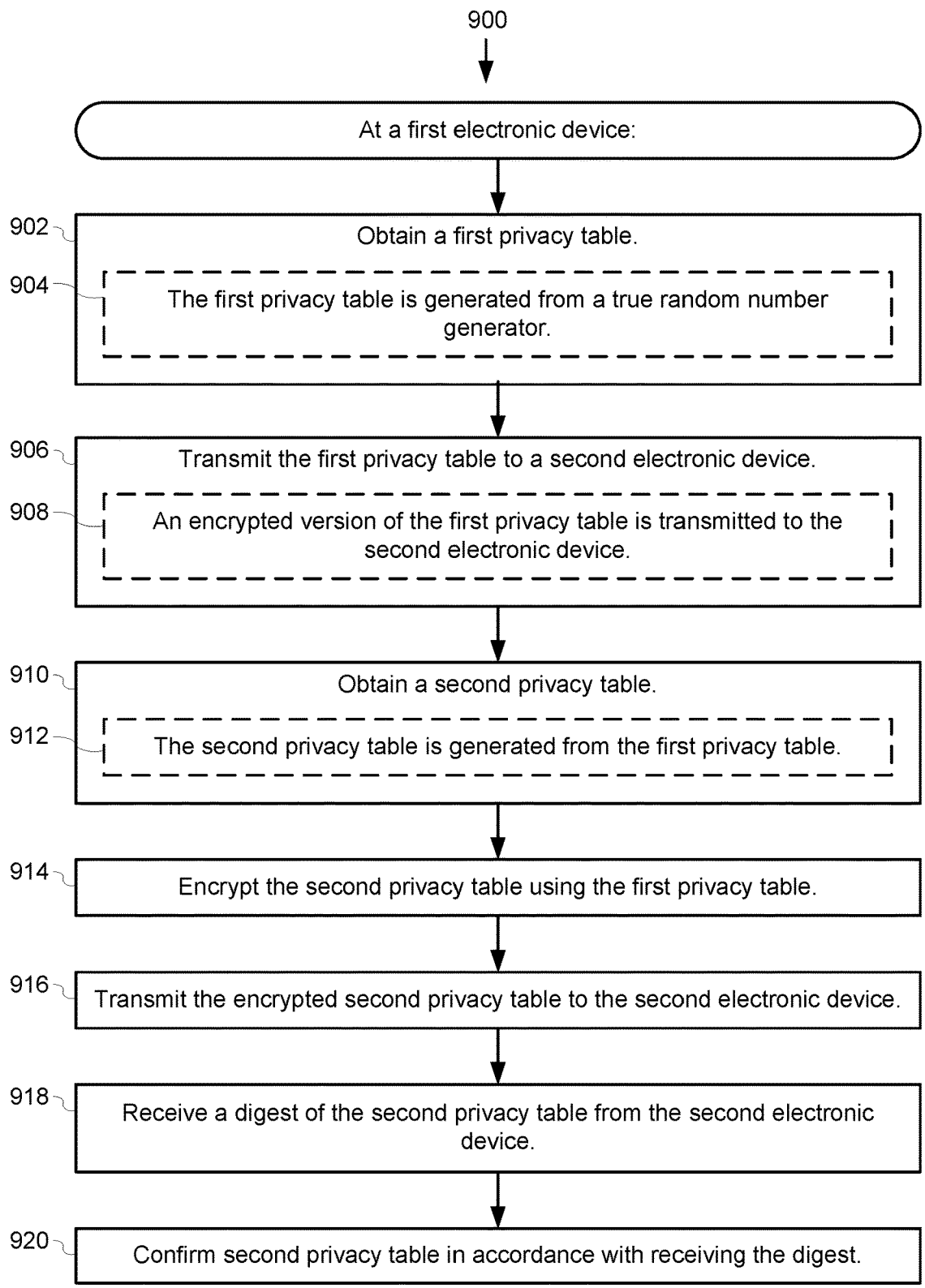
FIG. 9 provides a flowchart of a method for secure communications in accordance with some embodiments.

FIG. 9 provides a flowchart of a method 900 for secure communications (e.g., between devices of the secure communication system 100) in accordance with some embodiments. The method 900 is performed at a first electronic device (e.g., the electronic device 302). The first electronic device may correspond to any of the electronic devices shown in FIG. 1 (e.g., the electronic devices 110, 120, 130, or 140, or a device associated with the secure log 112) or any of the devices shown in FIG. 5 (e.g., a drone 502 or a landing station 508).

The first electronic device obtains (902) a first privacy table. In some embodiments, the first privacy table is obtained from a random number generating system (e.g., the random number generating system 216). In some embodiments, the first privacy table is generated (904) from a true random number generator. In some embodiments, the first privacy table is generated using a table generation module (e.g., the table generation module 229). In some embodiments, the first privacy table is transmitted to the first electronic device from a random number generating system (e.g., from the random number generating system 216), another electronic device, or a random number storage system.

The first electronic device transmits (906) the first privacy table to the second electronic device. In some embodiments, the first privacy table is transmitted to the second electronic device via an encrypted channel. In some embodiments, an encrypted version of the first privacy table is transmitted (908) to the second electronic device. In some embodiments, the first privacy table is encrypted using an encryption module (e.g., the encryption module 234).

The first electronic device obtains (910) a second privacy table. In some embodiments, the second privacy table is obtained from a random number generating system (e.g., the random number generating system 216). In some embodiments, the second privacy table is generated (912) from the first privacy table. For example, the second privacy table is a morph of the first privacy table (e.g., generated using the table morphing module 231).

The first electronic device encrypts (914) the second privacy table using the first privacy table. In some embodiments, the first electronic device generates a key from the first privacy table (e.g., using the primary key generation module 232). In some embodiments, the first electronic device encrypts the second privacy table using the generated key from the first privacy table. In some embodiments, the second privacy table is encrypted using an encryption module (e.g., the encryption module 234).

The first electronic device transmits (916) the encrypted second privacy table to the second electronic device. In some embodiments, the second privacy table is transmitted to the second electronic device via an encrypted channel.

The first electronic device receives (918) a digest of the second privacy table from the second electronic device. For example, the second electronic device generates the digest in response to receiving/decrypting the second privacy table.

In some embodiments, the second electronic device decrypts the second privacy table using a decryption module (e.g., the decryption module 236). In some embodiments, the second electronic device decrypts the second privacy table using a map of the first privacy table (e.g., a map received from the first electronic device). In some embodiments, after decryption of the second privacy table, the second electronic device generates a digest of the second privacy table and transmits the digest to the first electronic device.

The first electronic device confirms (920) the second privacy table in accordance with receiving the digest. In some embodiments, the first electronic device confirms that the digest received from the second electronic device matches a digest generated by the first electronic device (e.g., generated from the second privacy table). In some embodiments, confirming the second privacy table includes approving use of the second privacy table for encrypting future communications with the second electronic device. In some embodiments, confirming the second privacy table includes replacing the first privacy table with the second privacy table. In some embodiments, confirming the second privacy table includes using the second privacy table for future encryptions associated with the second electronic device (e.g., future encrypted messages between the first and second electronic devices). In some embodiments, in accordance with confirming the second privacy table, the first electronic device sends a confirmation to the second electronic device (e.g., informing the second electronic device that the second privacy may be used).

Turning now to some example embodiments of the methods, devices, systems, and computer-readable storage media described earlier.

(A1) In one aspect, some embodiments include a method (e.g., the method 800) of securing communications between electronic devices. In some embodiments, the method is performed at a first electronic device (e.g., the computer system 200) having memory 220 and one or more processors 210. The method includes: (i) obtaining a first version of a privacy table (e.g., from the random number generating system 216), the privacy table comprising N first bits, where N is a positive integer greater than 32; (ii) applying a predefined hashing algorithm (e.g., via the table morphing module 231) to the first version of the privacy table to generate a second version of the privacy table having N second bits; (iii) obtaining a first message (e.g., via the communication module 224 and/or the communication interfaces 212) for transmission to a second electronic device that (a) has a copy of the first version of the privacy table and (b) has access to the predefined hashing algorithm; (iv) generating a primary key based on the second version of the privacy table (e.g., via the primary key generation module 232); (v) encrypting the first message using the primary key to form an encrypted first message (e.g., via the encryption module 236); and (vi) transmitting (e.g., via the communication module 224) the encrypted first message and a version identifier for the second version of the privacy table to the second electronic device. In some embodiments, N is greater than or equal to 128.

(A2) In some embodiments of A1: (a) generating the primary key comprises: (i) generating a map (e.g., via the map generation module 230) based on the second version of the privacy table, where the map includes a set of parameter values that specify instructions to generate the primary key (e.g., as described previously with respect to FIG. 4A) from the second version of the privacy table; and (ii) generating the primary key according to the instructions in the map; and (b) the method further includes transmitting the map to the second electronic device (e.g., via the communication module 224). In some embodiments, the map is transmitted to the second electronic device with the encrypted first message.

(A3) In some embodiments of A2, the second electronic device decrypts the first message by: (i) applying the predefined hashing algorithm to the first version of the privacy table to generate the second version of the privacy table (e.g., via the table morphing module 231); (ii) recreating the primary key from the second version of the privacy table according to the map (e.g., via the primary key generation module 232); and (iii) decrypting the encrypted first message using the recreated primary key (e.g., via the decryption module 236).

(A4) In some embodiments of any of A1-A3, the hashing algorithm includes applying one or more hash functions (e.g., an SHA or MD5 algorithm). In some embodiments, the hashing algorithm is, at least part of, a morph agreement (e.g., the morph agreement 602). In some embodiments, the hashing algorithm has one or more parameters that can be set by a user of the first electronic device.

(A5) In some embodiments of any of A1-A4, the method further includes applying the predefined hashing algorithm to the second version of the privacy table to generate (e.g., via the table morphing module 231) a third version of the privacy table having N third bits. In some embodiments, different hash functions are used for the second and third versions. In some embodiments, the third version of the privacy table is added to a blockchain ledger as a new block.

(A6) In some embodiments of any of A1-A5, applying the predefined hashing algorithm to the first version of the privacy table comprises sequentially hashing portions of the first version of the privacy table in a predefined order. For example, starting at a first location (e.g., beginning, middle, or end) and rotating through the fields or portions of the privacy table.

(A7) In some embodiments of any of A1-A6: (i) the predefined hashing algorithm includes one or more numeric parameters; and (ii) applying the predefined hashing algorithm includes generating and using a corresponding parameter value for each of the one or more numeric parameters; and (iii) the method further includes transmitting the parameter values to the second electronic device along with the version identifier for the second version of the privacy table (e.g., as described previously with respect to FIG. 7B).

(A8) In some embodiments of any of A1-A7, the method further includes transmitting the first version of the privacy table to the second electronic device over an encrypted channel. In some embodiments, the privacy table is transmitted over a different channel than the encrypted messages.

(A9) In some embodiments of any of A1-A8, the second version of the privacy table is generated in accordance with a preset amount of time having elapsed after creation of the first version of the privacy table. For example, a morph agreement for the privacy table specifies that a new version of the privacy table should be generated each week, each month, or each year.

(A10) In some embodiments of any of A1-A9, the second version of the privacy table is generated in accordance with a preset number of messages being encrypted using the first version of the privacy table. For example, a morph agreement for the privacy table specifies that a new version of the privacy table should be generated after 1, 5, or 10 messages are transmitted (or received). In some embodiments, the second version of the privacy table is generated based on both the amount of time elapsed after creation of the first version and the number of messages encrypted.

(A11) In some embodiments of any of A1-A10, the second version of the privacy table is generated in response to a request from a user of the first electronic device. For example, the user of the first electronic device is presented with a user interface (e.g., for a corresponding messaging application) with an affordance for generating a new version of the privacy table.

(A12) In some embodiments of any of A1-A11, the method further includes, after transmitting the encrypted first message: (i) applying the predefined hashing algorithm to the second version of the privacy table to generate a third version of the privacy table having N third bits; (ii) obtaining a second message for transmission to the second electronic device; (iii) generating a second primary key based on the third version of the privacy table; (iv) encrypting the second message using the second primary key to form an encrypted second message; and (v) transmitting the encrypted second message and a version identifier for the third version of the privacy table to the second electronic device (e.g., as described previously with respect to operations 7-11 in FIG. 6A).

(A13) In some embodiments of any of A1-A12, the method further includes: (i) obtaining a blockchain for the privacy table (e.g., from the secure log 112), the blockchain including a genesis block for the first version of the privacy table; and (ii) in accordance with generating the second version of the privacy table, generating a second block and inserting the second block into the blockchain.

(A14) In some embodiments of A13, the method further includes: (i) after generating the second version of the privacy table, receiving a second encrypted message and a version identifier for the privacy table from the second electronic device, the version identifier indicating that the second encrypted message was generated using the first version of the privacy table; and (ii) decrypting the second encrypted message using information from the genesis block of the blockchain. For example, to obtain a previous version of the privacy table, the first electronic device retrieves the previous version (or information for reconstructing the previous version) from the blockchain.

(B1) In another aspect, some embodiments include a method (e.g., the method 900) of securing communications between electronic devices. In some embodiments, the method is performed at a first electronic device (e.g., the computer system 200) having memory 220 and one or more processors 210. The method includes: (i) obtaining a first privacy table; (ii) transmitting the first privacy table to a second electronic device; (iii) obtaining a second privacy table; (iv) encrypting the second privacy table using information from the first privacy table; and (v) transmitting the encrypted second privacy table to the second electronic device. In some embodiments, the second privacy table is obtained from a random number generating system (e.g., the random number generating system 216).

(B2) In some embodiments of B1, the second privacy table is generated at the first electronic device. In some embodiments, the second privacy table is generated by morphing the first privacy table stored at the first electronic device.

(B3) In some embodiments of B1 or B2, the method further includes, at the second electronic device, receiving and decrypting the encrypted second privacy table.

(B4) In some embodiments of B3, the method further includes, at the second electronic device, generating a digest of the second privacy table and transmitting the digest to the first electronic device.

(B5) In some embodiments of B4, the method further includes, at the first electronic device, receiving the digest and using the digest to confirm decryption of the second privacy table at the second electronic device. In some embodiments, the first electronic device compares the received digest with a digest generated from the second privacy table stored at the first electronic device.

(B6) In some embodiments of any of B1-B5, the second privacy table is encrypted using a key generated from the first privacy table.

(B7) In some embodiments of any of B1-B6, the first electronic device transmits a map to the second electronic device to assist the second electronic device in decrypting the encrypted second privacy table.

In another aspect, some embodiments include a computing system including one or more processors and memory coupled to the one or more processors, the memory storing one or more programs configured to be executed by the one or more processors, the one or more programs including instructions for performing any of the methods described herein (e.g., the methods 800, 900, A1-A14, and/or B1-B7 above).

In yet another aspect, some embodiments include a non-transitory computer-readable storage medium storing one or more programs configured for execution by one or more processors of a computing system, the one or more programs including instructions for performing any of the methods described herein (e.g., the methods 800, 900, A1-A14, and/or B1-B7 above).

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof.

As used herein, the term "if" means "when" or "upon" or "in response to determining" or "in response to detecting" or "in accordance with a determination that," depending on the context. Similarly, the phrase "if it is determined" or "if [a stated condition or event] is detected" means "upon determining" or "in response to determining" or "upon detecting [the stated condition or event]" or "in response to detecting [the stated condition or event]" or "in accordance with a determination that [a stated condition or event] is detected," depending on the context.

It will also be understood that, although the terms first and second are, in some instances, used herein to describe various elements, these elements should not be limited by these terms. These terms are used only to distinguish one element from another.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the scope to the precise forms disclosed. Many modifications and variations are possible in view of the above teachings. The embodiments were chosen and described in order to best explain the main principles and practical applications, to thereby enable others skilled in the art to best utilize the various embodiments and make various modifications as are suited to the particular use contemplated.

What is claimed is:

1. A method performed at a first electronic device, comprising:
    obtaining a first version of a privacy table, the first version of the privacy table comprising N first bits, wherein N is a positive integer greater than 32;
    applying a predefined hashing algorithm to the first version of the privacy table to generate a second version of the privacy table having N second bits;
    obtaining a first message for transmission to a second electronic device;
    generating a primary key based on the second version of the privacy table;
    encrypting the first message using the primary key to form an encrypted first message; and
    transmitting the encrypted first message and a version identifier for the second version of the privacy table to the second electronic device, wherein, prior to transmitting the encrypted first message and the version identifier to the second electronic device, the second electronic device: (i) has a copy of the first version of the privacy table, (ii) has access to the predefined hashing algorithm, and (iii) is configured to generate the second version of the privacy table at the second electronic device upon determining that a version identifier for the second version of the privacy table does not match a version identifier for the first version of the privacy table.

2. The method of claim 1, wherein generating the primary key comprises:
    generating a map based on the second version of the privacy table, wherein the map includes a set of parameter values that specify instructions to generate the primary key from the second version of the privacy table;
    generating the primary key according to the instructions in the map; and
    the method further comprises transmitting the map to the second electronic device.

3. The method of claim 2, wherein the second electronic device decrypts the first message by:
    applying the predefined hashing algorithm to the first version of the privacy table to generate the second version of the privacy table;
    recreating the primary key from the second version of the privacy table according to the map; and
    decrypting the encrypted first message using the recreated primary key.

4. The method of claim 1, wherein the hashing algorithm includes applying one or more hash functions.

5. The method of claim 1, further comprising applying the predefined hashing algorithm to the second version of the privacy table to generate a third version of the privacy table having N third bits.

6. The method of claim 1, wherein applying the predefined hashing algorithm to the first version of the privacy table comprises sequentially hashing portions of the first version of the privacy table in a predefined order.

7. The method of claim 1, wherein:
the predefined hashing algorithm includes one or more numeric parameters; and
applying the predefined hashing algorithm includes generating and using a corresponding parameter value for each of the one or more numeric parameters; and
the method further comprises transmitting the parameter values to the second electronic device along with the version identifier for the second version of the privacy table.

8. The method of claim 1, further comprising transmitting the first version of the privacy table to the second electronic device over an encrypted channel.

9. The method of claim 1, wherein the second version of the privacy table is generated in accordance with a preset amount of time having elapsed after creation of the first version of the privacy table.

10. The method of claim 1, wherein the second version of the privacy table is generated in accordance with a preset number of messages being encrypted using the first version of the privacy table.

11. The method of claim 1, wherein the second version of the privacy table is generated in response to a request from a user of the first electronic device.

12. The method of claim 1, further comprising, after transmitting the encrypted first message:
applying the predefined hashing algorithm to the second version of the privacy table to generate a third version of the privacy table having N third bits;
obtaining a second message for transmission to the second electronic device;
generating a second primary key based on the third version of the privacy table;
encrypting the second message using the second primary key to form an encrypted second message; and
transmitting the encrypted second message and a version identifier for the third version of the privacy table to the second electronic device.

13. The method of claim 1, further comprising:
obtaining a blockchain for the privacy table, the blockchain including a genesis block for the first version of the privacy table; and
in accordance with generating the second version of the privacy table, generating a second block and inserting the second block into the blockchain.

14. The method of claim 13, further comprising:
after generating the second version of the privacy table, receiving a second encrypted message and a version identifier for the privacy table from the second electronic device, the version identifier indicating that the second encrypted message was generated using the first version of the privacy table; and
decrypting the second encrypted message using information from the genesis block of the blockchain.

15. A computing device, comprising:
one or more processors; and
memory coupled to the one or more processors, the memory storing one or more programs configured to be executed by the one or more processors, the one or more programs including instructions for:
obtaining a first version of a privacy table, the first version of the privacy table comprising N first bits, wherein N is a positive integer greater than 32;
applying a predefined hashing algorithm to the first version of the privacy table to generate a second version of the privacy table having N second bits;
obtaining a first message for transmission to a second electronic device;
generating a primary key based on the second version of the privacy table;
encrypting the first message using the primary key to form an encrypted first message; and
transmitting the encrypted first message and a version identifier for the second version of the privacy table to the second electronic device, wherein, prior to transmitting the encrypted first message and the version identifier to the second electronic device, the second electronic device: (i) has a copy of the first version of the privacy table, (ii) has access to the predefined hashing algorithm, and (iii) is configured to generate the second version of the privacy table at the second electronic device upon determining that a version identifier for the second version of the privacy table does not match a version identifier for the first version of the privacy table.

16. The computing device of claim 15, wherein generating the primary key comprises:
generating a map based on the second version of the privacy table, wherein the map includes a set of parameter values that specify instructions to generate the primary key from the second version of the privacy table;
generating the primary key according to the instructions in the map; and
the one or more programs further include instructions for transmitting the map to the second electronic device.

17. The computing device of claim 15, wherein applying the predefined hashing algorithm to the first version of the privacy table comprises sequentially hashing portions of the first version of the privacy table in a predefined order.

18. The computing device of claim 15, wherein the second version of the privacy table is generated in accordance with a preset amount of time having elapsed after creation of the first version of the privacy table.

19. The computing device of claim 15, wherein the one or more programs further include instructions for:
obtaining a blockchain for the privacy table, the blockchain including a genesis block for the first version of the privacy table; and
in accordance with generating the second version of the privacy table, generating a second block and inserting the second block into the blockchain.

20. A non-transitory computer-readable storage medium storing one or more programs configured for execution by a computer system having one or more processors and memory, the one or more programs comprising instructions for:
obtaining a first version of a privacy table, the first version of the privacy table comprising N first bits, wherein N is a positive integer greater than 32;
applying a predefined hashing algorithm to the first version of the privacy table to generate a second version of the privacy table having N second bits;
obtaining a first message for transmission to a second electronic device;
generating a primary key based on the second version of the privacy table;
encrypting the first message using the primary key to form an encrypted first message; and
transmitting the encrypted first message and a version identifier for the second version of the privacy table to the second electronic device, wherein, prior to transmitting the encrypted first message and the version identifier to the second electronic device, the second electronic device: (i) has a copy of the first version of the privacy table, (ii) has access to the predefined hashing algorithm, and (iii) is configured to generate the second version of the privacy table at the second electronic device upon determining that a version identifier for the second version of the privacy table does not match a version identifier for the first version of the privacy table.

* * * * *